(12) United States Patent
Shiraishi

(10) Patent No.: US 7,158,160 B2
(45) Date of Patent: Jan. 2, 2007

(54) OPTICAL BEAM SCANNING DEVICE AND IMAGE FORMING APPARATUS

(75) Inventor: Takashi Shiraishi, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 220 days.

(21) Appl. No.: 10/993,494

(22) Filed: Nov. 22, 2004

(65) Prior Publication Data

US 2005/0110860 A1 May 26, 2005

Related U.S. Application Data

(62) Division of application No. 10/428,032, filed on May 2, 2003, now Pat. No. 6,842,187.

(51) Int. Cl.
*B41J 2/385* (2006.01)
*B41J 2/435* (2006.01)

(52) U.S. Cl. ......................... 347/116; 347/235; 347/250

(58) Field of Classification Search ........ 347/115–117, 347/229, 232–235, 248–250; 359/204–226
See application file for complete search history.

(56) References Cited

U.S. PATENT DOCUMENTS

| | | | |
|---|---|---|---|
| 5,715,078 A | 2/1998 | Shiraishi | |
| 5,754,214 A * | 5/1998 | Okino | ........................ 347/229 |
| 5,774,274 A | 6/1998 | Schachar | |
| 5,808,772 A | 9/1998 | Yamaguchi et al. | |
| 5,838,479 A | 11/1998 | Shiraishi | |
| 5,850,306 A | 12/1998 | Fukutome et al. | |
| 6,100,912 A | 8/2000 | Shiraishi et al. | |
| 6,381,078 B1 | 4/2002 | Yamaguchi et al. | |
| 6,549,227 B1 | 4/2003 | Shiraishi et al. | |
| 6,654,041 B1 | 11/2003 | Takesue | |
| 6,683,708 B1 | 1/2004 | Shiraishi et al. | |
| 7,071,957 B1 * | 7/2006 | Fujimoto | ..................... 347/116 |

FOREIGN PATENT DOCUMENTS

| | | |
|---|---|---|
| JP | 7-256926 A | 10/1995 |
| JP | 8-271817 A | 10/1996 |
| JP | 2000-255097 A | 3/2000 |

* cited by examiner

*Primary Examiner*—Hai Pham
(74) *Attorney, Agent, or Firm*—Foley & Lardner LLP

(57) ABSTRACT

An optical beam scanning device includes plural light sources, a pre-deflection optical unit, a light deflection unit, a post-deflection optical unit, and a horizontal synchronization unit. One of the formed plural latent images is formed by plural light beams while the other latent images are respectively formed by one light beam, and the light deflection unit deflects the light beams forming the plurality latent images by one surface or integrally processed surface thereof. The horizontal synchronization unit is on a position of an upstream side of scanning lines forming the latent image formed by the plural light beams and detects that the light beam forming the latent image formed by the plural light beams reaches a predetermined position. The image forming apparatus employs the optical beam scanning device and controls timing to form images by the respective light beams with reference to a moment when the light beam to be detected reaches a predetermined position.

12 Claims, 25 Drawing Sheets

Fig.11

```
ADJUSTMENT OF MAGNIFICATION AND POSITION IN THE
MAIN-SCANNING DIRECTION OF THE BLACK MULTI-BEAMS
```

AT THE BEAM POSITION DETECTING AREA, A PRECEDING BLACK BEAM IS TURNED ON, THE OTHER BEAM IS TURNED OFF, AND A REFERENCE TIME WHEN THE TURNED-ON BEAM PASSES THE BEAM POSITION DETECTING UNIT 23A IS MEASURED. THEREAFTER, A SUCCEEDING BEAM IS TURNED ON, THE OTHER BEAM IS TURNED OFF, AND A REFERENCE TIME WHEN THE TURNED-ON BEAM PASSES THE BEAM POSITION DETECTING UNIT 23A IS MEASURED. THE RESPECTIVE BLACK BEAMS START WRITING OF REGISTRATION MEASURING IMAGES FROM THE MOMENT WHEN AN INITIALLY (OR PREVIOUSLY) SET MARGIN $\Delta$TKO ELAPSES FROM THE RESPECTIVE REFERENCE MOMENTS. —S20

AT THE BEAM POSITION DETECTING AREA, A PRECEDING BLACK BEAM IS TURNED ON, THE OTHER BEAM IS TURNED OFF, AND A REFERENCE TIME WHEN THE TURNED-ON BEAM PASSES THE BEAM POSITION DETECTING UNIT 23B IS MEASURED. THEREAFTER, A SUCCEEDING BEAM IS TURNED ON, THE OTHER BEAM IS TURNED OFF, AND A REFERENCE TIME WHEN THE TURNED-ON BEAM PASSES THE BEAM POSITION DETECTING UNIT 23B IS MEASURED. THE RESPECTIVE BLACK BEAMS START WRITING OF REGISTRATION MEASURING IMAGES FROM THE MOMENT WHEN AN INITIALLY (OR PREVIOUSLY) SET MARGIN $\Delta$TKO ELAPSES FROM THE RESPECTIVE REFERENCE MOMENTS. —S21

BASED ON A READING TIME DIFFERENCE BETWEEN REGISTRATION SENSORS, DEVIATION MAGNIFICATION IN THE MAIN-SCANNING DIRECTION AND LATERAL DISPLACEMENT AMOUNT IN THE MAIN-SCANNING DIRECTION OF THE BLACK FIRST AND SECOND BEAMS ARE CALCULATED. AN IMAGE CLOCK FREQUENCY FOR BLACK BEAMS IS SELECTED, AND $\Delta$TKO IS RESET. —S22

THE RESET BLACK IMAGE CLOCK FREQUENCY IS HELD AT THE IMAGE CLOCK GENERATING UNIT. —S23

IN THE DELAY TIME DATA HOLDING UNITS OF THE DATA CONTROL UNITS FOR THE BLACK FIRST AND SECOND BEAMS, THE RESET VALUE $\Delta$TKO IS HELD. —S24

( RETURN )

Fig. 14

```
ADJUSTMENT OF MAGNIFICATION AND POSITION IN THE
MAIN-SCANNING DIRECTION OF THE COLOR-USE BEAM
```

AT THE BEAM POSITION DETECTING AREA, THE PRECEDING BLACK BEAM IS TURNED ON. THE OTHER BEAMS ARE TURNED OFF. WRITING OF REGISTRATION MEASURING IMAGES WITH RESPECTIVE COLOR BEAMS IS EFFECTED IN WHICH THE YELLOW-USE BEAM, MAGENTA-USE BEAM AND CYAN-USE BEAM ARE DELAYED BY THE TIME OF INITIALLY (PREVIOUSLY) SET MARGINS ($\Delta TYO$, $\Delta TMO$ AND $\Delta TCO$) FROM THE MOMENT WHEN BEAM POSITION DETECTING UNIT 23A IS DETECTED. (BLACK-USE BEAM IS TURNED OFF WHEN THE BEAM POSITION DETECTING UNIT 23A IS DETECTED). — S30

BASED ON THE READING TIME DIFFERENCE BETWEEN REGISTRATION SENSORS, MAGNIFICATION DEVIATION IN THE MAIN-SCANNING DIRECTION AND LATERAL DISPLACEMENT AMOUNT IN THE MAIN-SCANNING DIRECTION OF THE YELLOW-USE, MAGENTA-USE, CYAN-USE BEAMS ARE CALCULATED; IMAGE CLOCK FREQUENCIES FOR RESPECTIVE COLOR-USE BEAMS ARE SELECTED, AND $\Delta TYO$, $\Delta TMO$ AND $\Delta TCO$ ARE RESET. — S31

THE IMAGE CLOCK FREQUENCIES FOR THE YELLOW-USE, MAGENTA-USE, AND CYAN-USE BEAMS THUS RESET ARE HELD IN THE RESPECTIVE IMAGE CLOCK GENERATING UNITS. — S32

IN THE DELAY TIME DATA HOLDING UNIT OF THE DATA CONTROL UNIT FOR THE YELLOW-USE, MAGENTA-USE, CYAN-USE BEAMS, $\Delta TYO$, $\Delta TMO$, AND $\Delta TCO$ THUS RESET ARE HELD. — S33

RETURN

YELLOW/MAGENTA/CYAN/BLACK-USE BEAM RELATIVE
POSITION MEASURING AREA (COMMON)

Fig.21

( ADJUSTMENT OF MAGNIFICATION AND POSITION IN THE MAIN-SCANNING DIRECTION OF THE COLOR-USE BEAM )

AT THE BEAM POSITION DETECTING AREA, THE BLACK FIRST AND SECOND BEAMS ARE TURNED ON, WRITING OF REGISTRATION MEASURING IMAGES WITH RESPECTIVE COLOR BEAM IS EFFECTED IN WHICH THE YELLOW-USE BEAM, MAGENTA-USE BEAM, AND CYAN-USE BEAM ARE DELAYED BY THE TIME OF INITIALLY (PREVIOUSLY) SET MARGINS ($\Delta TYO$, $\Delta TMO$ AND $\Delta TCO$) FROM THE MOMENT WHEN BEAM POSITION DETECTING UNIT 23A DETECT THE FIRST BEAM (THE BLACK-USE BEAM IS TURNED OFF WHEN THE BEAM POSITION DETECTING UNIT 23A IS DETECTED). — S70

BASED ON THE READING TIME DIFFERENCE BETWEEN REGISTRATION SENSORS, MAGNIFICATION DEVIATION IN THE MAIN-SCANNING DIRECTION AND LATERAL DISPLACEMENT AMOUNT IN THE MAIN-SCANNING DIRECTION OF THE YELLOW-USE, MAGENTA-USE, CYAN-USE BEAMS ARE CALCULATED. THE IMAGE CLOCK FREQUENCIES FOR THE RESPECTIVE COLOR-USE BEAMS ARE SELECTED, AND $\Delta TYO$, $\Delta TMO$ AND $\Delta TCO$ ARE RESET. — S71

THE IMAGE CLOCK FREQUENCIES FOR THE YELLOW-USE, MAGENTA-USE, AND CYAN-USE BEAMS THUS RESET ARE HELD IN RESPECTIVE IMAGE CLOCK GENERATING UNITS. — S72

IN THE DELAY TIME DATA HOLDING UNITS OF THE DATA CONTROL UNITS FOR THE YELLOW-USE, MAGENTA-USE, CYAN-USE BEAMS, $\Delta TYO$, $\Delta TMO$ AND $\Delta TCO$ THUS RESET ARE HELD. — S73

( RETURN )

Fig.22

( IMAGE WRITING )

THE IMAGE CLOCK FREQUENCIES FOR THE RESPECTIVE BEAMS ARE SET TO VALUES DECIDED AT ABOVE-MENTIONED STEPS. — S80

AT THE BEAM POSITION DETECTING AREA, THE BLACK FIRST AND SECOND BEAMS ARE TURNED ON, IMAGE WRITING IS EFFECTED THAT IS DELAYED BY THE TIME OF $\Delta TKO$ FOR THE BLACK FIRST BEAM, $\Delta TKO + \Delta TK2 - \Delta TK1$ FOR THE BLACK SECOND BEAM, $\Delta TYO$ FOR THE YELLOW-USE BEAM, $\Delta TMO$ FOR THE MAGENTA-USE BEAM AND $\Delta TCO$ FOR THE CYAN-USE BEAM, RESPECTIVELY, FROM THE MOMENT WHEN BEAM POSITION DETECTING UNIT 23A DETECTS THE EARLIEST BEAM. (BLACK-USE BEAMS ARE TURNED OFF AT THE MOMENT WHEN THE BEAM POSITION DETECTING UNIT 23A IS DETECTED.) — S81

( RETURN )

Fig.31

```
ADJUSTMENT OF MAGNIFICATION AND POSITION IN THE
MAIN-SCANNING DIRECTION OF THE BLACK MULTI-BEAMS
```

AT THE BEAM POSITION DETECTING AREA, THE BLACK FIRST TO FOURTH BEAMS ARE TURNED ON, WRITING OF REGISTRATION MEASURING PATTERN IS EFFECTED, IN WHICH THE BLACK FIRST BEAM IS DELAYED BY THE TIME OF INITIALLY (PREVIOUSLY) SET MARGIN ($\Delta$TKO), THE BLACK SECOND BEAM IS DELAYED BY THE TIME OBTAINED BY ADDING THE ABOVE-MENTIONED $\Delta$TK2 - $\Delta$TK1 TO THE INITIALLY (PREVIOUSLY) SET MARGIN ($\Delta$TKO), THE BLACK THIRD BEAM IS DELAYED BY THE TIME OBTAINED BY ADDING THE ABOVE-MENTIONED $\Delta$TK3 - $\Delta$TK1 TO THE INITIALLY (PREVIOUSLY) SET MARGIN ($\Delta$TKO), THE BLACK FOURTH BEAM IS DELAYED BY THE TIME OBTAINED BY ADDING THE ABOVE-MENTIONED $\Delta$TK4 - $\Delta$TK1 TO THE INITIALLY (PREVIOUSLY) SET MARGIN ($\Delta$TKO) RESPECTIVELY FROM THE MOMENT WHEN THE BEAM POSITION DETECTING UNIT 23A DETECTS THE EARLIEST BEAM. — S940

AT THE BEAM POSITION DETECTING AREA, THE BLACK FIRST TO FOURTH BEAMS ARE TURNED ON, WRITING OF REGISTRATION MEASURING PATTERN IS EFFECTED, IN WHICH THE BLACK FIRST BEAM IS DELAYED BY THE TIME OF INITIALLY (PREVIOUSLY) SET MARGIN ($\Delta$TKO), THE BLACK SECOND BEAM IS DELAYED BY THE TIME OBTAINED BY ADDING THE ABOVE-MENTIONED $\Delta$TK2 - $\Delta$TK1 TO THE INITIALLY (PREVIOUSLY) SET MARGIN ($\Delta$TKO), THE BLACK THIRD BEAM IS DELAYED BY THE TIME OBTAINED BY ADDING THE ABOVE-MENTIONED $\Delta$TK3 - $\Delta$TK1 TO THE INITIALLY (PREVIOUSLY) SET MARGIN ($\Delta$TKO), THE BLACK FOURTH BEAM IS DELAYED BY THE TIME OBTAINED BY ADDING THE ABOVE-MENTIONED $\Delta$TK4 - $\Delta$TK1 TO THE INITIALLY (PREVIOUSLY) SET MARGIN ($\Delta$TKO) RESPECTIVELY FROM THE MOMENT WHEN THE BEAM POSITION DETECTING UNIT 23B DETECTS THE EARLIEST BEAM. — S941

BASED ON THE READING TIME DIFFERENCE BETWEEN REGISTRATION SENSORS, DEVIATION MAGNIFICATION IN THE MAIN-SCANNING DIRECTION AND LATERAL DISPLACEMENT AMOUNT IN THE MAIN-SCANNING DIRECTION OF THE BLACK FIRST TO FOURTH BEAMS ARE CALCULATED, IMAGE CLOCK FREQUENCIES FOR BLACK BEAM ARE SELECTED, AND $\Delta$TKO, $\Delta$TK2 - $\Delta$TK1, $\Delta$TK3 - $\Delta$TK1 AND $\Delta$TK4 - $\Delta$TK1 ARE RESET. — S942

THE RESET IMAGE CLOCK FREQUENCY FOR BLACK IS HELD IN THE IMAGE CLOCK GENERATING UNIT. — S943

IN THE DELAY TIME DATA HOLDING UNIT OF THE DATA CONTROL UNIT FOR THE BLACK FIRST BEAM, THE RESET $\Delta$TKO IS HELD. IN THE DELAY TIME DATA HOLDING UNIT OF THE DATA CONTROL UNIT FOR THE BLACK SECOND BEAM, THE RESET $\Delta$TKO + $\Delta$TK2 - $\Delta$TK1 IS HELD. IN THE DELAY TIME DATA HOLDING UNIT OF THE DATA CONTROL UNIT FOR THE BLACK THIRD BEAM, THE RESET $\Delta$TKO + $\Delta$TK3 - $\Delta$TK1 IS HELD AND IN THE DELAY TIME DATA HOLDING UNIT OF THE DATA CONTROL UNIT FOR THE BLACK FOURTH BEAMS, THE RESET $\Delta$TKO + $\Delta$TK4 - $\Delta$TK1 IS HELD. — S944

( RETURN )

Fig.32

ADJUSTMENT OF MAGNIFICATION AND POSITION IN THE MAIN-SCANNING DIRECTION OF THE COLOR-USE BEAM

AT THE BEAM POSITION DETECTING AREA, THE BLACK FIRST TO BLACK FOURTH BEAMS ARE TURNED ON; WRITING OF REGISTRATION MEASURING IMAGES WITH RESPECTIVE COLOR BEAMS IS EFFECTED, IN WHICH THE YELLOW-USE BEAM, MAGENTA-USE BEAM AND CYAN-USE BEAM ARE RESPECTIVELY DELAYED BY THE TIME OF INITIALLY (PREVIOUSLY) SET MARGINS ($\Delta TYO$, $\Delta TMO$ AND $\Delta TCO$) FROM THE MOMENT WHEN BEAM POSITION DETECTING UNIT 23A DETECT THE FIRST BEAM. (THE BLACK-USE BEAM IS TURNED OFF WHEN THE BEAM POSITION DETECTING UNIT 23A DETECTS THE EARLIEST BEAM.) — S950

BASED ON THE READING TIME DIFFERENCE BETWEEN REGISTRATION SENSORS, DEVIATION MAGNIFICATION IN THE MAIN-SCANNING DIRECTION AND LATERAL DISPLACEMENT AMOUNT IN THE MAIN-SCANNING DIRECTION OF THE YELLOW-USE, MAGENTA-USE, AND CYAN-USE BEAMS ARE CALCULATED. IMAGE CLOCK FREQUENCIES FOR RESPECTIVE COLOR BEAMS ARE SELECTED, AND $\Delta TYO$, $\Delta TMO$ AND $\Delta TCO$ ARE RESET. — S951

THE RESET IMAGE CLOCK FREQUENCIES OF YELLOW-USE, MAGENTA-USE, AND CYAN-USE BEAMS ARE HELD IN THE RESPECTIVE IMAGE CLOCK GENERATING UNITS. — S952

IN THE DELAY TIME DATA HOLDING UNITS OF THE DATA CONTROL UNITS FOR YELLOW-USE, MAGENTA-USE AND CYAN-USE BEAMS, THE RESET $\Delta TYO$, $\Delta TMO$ AND $\Delta TCO$ ARE HELD. — S953

RETURN

Fig.33

IMAGE WRITING

THE IMAGE CLOCK FREQUENCIES FOR THE RESPECTIVE BEAMS ARE SET TO VALUES DECIDED AT ABOVE-STEPS — S960

AT THE BEAM POSITION DETECTING AREA, THE BLACK FIRST AND SECOND BEAMS ARE TURNED ON. IMAGE WRITING IS EFFECTED THAT IS DELAYED BY THE TIME $\Delta TKO$ FOR THE BLACK FIRST BEAM, $\Delta TKO + \Delta TK2 - \Delta TK1$ FOR THE BLACK SECOND BEAM, $\Delta TKO + \Delta TK3 - \Delta TK1$ FOR THE BLACK THIRD BEAM, $\Delta TKO + \Delta TK4 - \Delta TK1$ FOR THE BLACK FOURTH BEAM $\Delta TYO + \Delta TY2 - \Delta TY1$ FOR THE YELLOW-USE SECOND BEAM, $\Delta TMO$ FOR THE MAGENTA-USE BEAM, OR THE LIKE, FROM THE MOMENT WHEN BEAM POSITION DETECTING UNIT 23A IS DETECTED.(THE BLACK-USE BEAM IS TURNED OFF AT THE MOMENT WHEN THE BEAM POSITION DETECTING UNIT 23A IS DETECTED.) — S961

RETURN

OPTICAL BEAM SCANNING DEVICE AND IMAGE FORMING APPARATUS

The present application is a divisional of U.S. application Ser. No. 10/428,032, filed May 2, 2003 now U.S. Pat. No. 6,842,187, the entire contents of which are incorporated herein by reference.

BACKGROUND OF THE INVENTION

The present invention relates to an optical beam scanning device which is applicable to color printers with a plural-drum type, color copy machines, digital copy machines, digital multi function peripherals, and so forth and an image forming apparatus in which the optical beam scanning device is employed.

For example, in an image forming apparatus such as digital multi function peripherals with a plural-drum type, a plurality of image forming units each of which corresponds to a color component obtained by color separation are employed, and also optical beam scanning units each of which provides each of the image forming units with a laser beam, namely, image data corresponding to a color component are used. Each of the image forming units transfers an image of a color component associated with itself onto a recording medium Here, in order to obtain a preferable color image, it is necessary that, with respect to each color component, positions and distances in the main-scanning direction and positions and distances in the sub-scanning direction or the like are congruent with one another or have in appropriate relationships and in order to meet the needs, an adjusting mechanism or the like is provided.

For example, U.S. Pat. No. 5,774,274 discloses a technique in which an assembly of mirrors are used whose angles in the main- and sub-scanning direction are different with respect to each laser beam of respective color components so that laser beams of respective color components are guided to one horizontal synchronization sensor, and timing of the each color component is taken by means of detection outputs of laser beams having different reflection angles. It is also disclosed that a technique in which, with respect to each color component, the number of laser beams of respective color components is two or more, the position in the sub-scanning direction is detected, and on the basis of the result obtained, the actuators each of which controls the distance between the beams associated with the same color component are moved, whereby image surface beam distances are kept to a constant value.

Further, it is disclosed that a technique in which, by means of the registration sensor, written registration measuring image data is read, and on the basis of the result of the reading and so on, registration correction information is prepared.

However, a technique in which an assembly of mirrors whose angles are respectively different in the main-scanning and sub-scanning directions with respect to each of the laser beams of the color components are used to guide the laser beams of the respective color components to one horizontal synchronization sensor, a large swing angle of the polygon mirror is needed for causing the respective color component beams to be incident onto the horizontal synchronization sensor.

For this reason where the effective field angle as an entire optical system (sum of an angle provided for controlling the beam position and image effective field angle) is the same, a problem is caused that the image effective field angle (area) becomes narrow. Also, where the image effective field angle (area) is the same, a problem is caused that deflection angle, which is used to secure properties such as the relative positions between beams, image formation properties and the like become substantially large. There is a further problem that since the scanning optical system is required to secure properties including the imaging characteristic, fθ characteristic, inter-beam pitch (pitch between beams) in the main- and sub-scanning directions and so on for the horizontal synchronization sensor located outside the imaging area in the main-scanning direction, it becomes difficult to secure an imaging characteristic and so on in an entire apparatus, and the sizes of the optical elements for imaging and a polygon mirror become large.

Further, there is still another problem that since detection and control of their positional relationships are performed with respect to each of the color components constituted by a plurality of laser beam, the constructions for the detection and control become complicated or the processing for the detection and control become complicated.

Still further, it is required that the position of the registration sensor is accurately adjusted and kept.

With respect to the main-scanning direction of the exposure onto the photosensitive drum by means of the scanning optical system, when the succeeding factors occur, with reference to the position of the horizontal synchronization sensor, magnification varies at almost the same rate in an entire area.

i) deviation of magnification in the main-scanning direction caused by the deviation of wavelengths of the laser beam by temperature change, ii) deviation of magnification in the main-scanning direction caused by thermal expansion of the optical components, housing, positioning components in the device and so on, and iii) deviation of magnification caused by the change in distance between the optical elements and the photosensitive drum.

Under the technique in which the magnification in the main-scanning direction is measured on the basis of the output of the registration sensor, and the magnification thus measured is corrected by means of image clocks, such a problematic situation arises as the registration correction causes unintentional magnification deviation for the succeeding reason. Specifically, when the distance between a pair of registration sensors is deviated at an initial stage or in the course of the operation, the magnification in the main scanning direction being measured becomes an incorrect value. However, it cannot be discerned whether the magnification deviation is caused by the above-mentioned factors i) to iii) or by the distance deviation in the registration sensors.

For the above-mentioned reasons, it is required accurately to adjust the positions of the registration sensors so as to keep the position thus adjusted but when a positional displacement caused by, for example, secular change or the like occur, the above-mentioned problems occur inevitably.

SUMMARY OF THE INVENTION

The purpose of an optical beam scanning device and an image forming apparatus of the invention is, on one hand, to minimize the number of sensors for detecting horizontal synchronization and, on the other hand, to decrease a deflection angle necessary for the horizontal synchronization in the optical beam scanning device which writes plural latent images using a plurality of light beams.

Moreover, the purpose of the optical beam scanning device and the image forming apparatus of the invention is to achieve preferable image forming precision by appropriately obtaining information such as registration correction information even if the deflection angle necessary for the horizontal synchronization is made smaller.

Furthermore, the purpose of the optical beam scanning device and the image forming apparatus of the invention is to detect magnification deviation in a main-scanning direction precisely regardless of installation precision of registration sensors.

The optical beam scanning device of the invention comprises a plurality of light sources, a pre-deflection optical unit that provides predetermined characteristics for a plurality of light beams from the plurality of light sources, one light deflection unit that deflects the plurality of light beams provided with the predetermined characteristics by the pre-deflection optical unit in a predetermined direction, a post-deflection optical unit that causes the plurality of light beams deflection-scanned by the light deflection unit to image on respective scanned surfaces, so that a plurality of latent images are formed, and an only horizontal synchronization unit for which the plurality of light beams are provided that passed through at least a portion of the post-deflection optical unit.

Said pre-deflection optical unit, said light deflection unit, and said post-deflection optical unit operate so that one of the plurality of latent images to be formed is formed by the plurality of light beams while each of the other latent images are formed by one light beam. Said light deflection unit deflects light beams that form the plurality of latent images by one surface or an integrally processed surface thereof. Said horizontal synchronization unit is on a position of an upstream side of scanning lines to form the latent image formed by the plurality of light beams and detects that the light beam forming the latent image formed by the plurality of light beams reached a predetermined position. At the time of latent image forming, timing for writing all of the latent images is determined based on a signal from said only one horizontal synchronization unit.

The image forming apparatus of the invention comprises an optical beam scanning device that forms the plurality of latent images and an image writing control unit. Here, said optical beam scanning device forms one of the plurality of latent images, which are to be formed, with the plurality of light beams while forms each of the other latent images with one light beam and comprises a plurality of light sources, a pre-deflection optical unit that provides predetermined characteristics for the plurality of light beams from the plurality of light sources, one light deflection unit that forms the plurality of latent images with the one surface or the integrally processed surface thereof and deflects the plurality of light beams from said pre-deflection optical unit in a predetermined direction, a post-deflection optical unit that causes the plurality of light beams deflection-scanned by the light deflection unit to image on respective corresponding scanned surfaces, so that the plurality of latent images are formed, and a horizontal synchronization unit which is on a position of an upstream side of scanning lines by the light beam to form the latent image formed by the plurality of light beams among the plurality of light beams that passed at least a portion of the post-deflection optical unit and detects that each light beam to form the latent image formed by the plurality of light beams reached a predetermined position. Said horizontal synchronization unit detects that one of the plurality of light beams to form the latent image formed by the plurality of light beams reached a predetermined position, thereafter, said image writing control unit, in an image forming mode, performs on-off control of said respective light sources for the respective light beams to form one latent image with detected light beam and one light beam according to image data after a predetermined time period defined by a registration correction information at the time has elapsed.

According to the above-described optical beam scanning device and the image forming apparatus of the invention, the deflection angle for horizontal synchronization can be made smaller because only one of the plurality of light beams forming one latent image is adapted to be guided to the horizontal synchronization unit during image formation. Hence, on one hand, an area required for securing performance as the post-deflection optical unit can be made smaller to promote enhanced performance and, on the other hand, increasing in size of both the post-deflection optical unit and a rotating polygon mirror in the light deflection unit can be avoided. In addition, also in the horizontal synchronization unit, a simple plane mirror can be available as a deflecting mirror used for separating light beams to be detected and thus cost advantage can be achieved. Alternatively, when the post-deflection optical units and the light deflection units having the similar structures to prior arts are applied, the deflection angle forming image can be made larger because of the smaller deflection angle for the horizontal synchronization.

When all of the light beams are deflected by the one deflection surface or the integrally processed deflection surface, relative positions of the plurality of light beams to form different latent images does not vary with respect to each surface and thus preferable positional relationship of the plurality of images can be achieved even if one light beam is used as a reference light beam.

Another image forming apparatus of the invention comprises an optical beam scanning device forming the plurality of latent images and an image writing control unit. Said optical beam scanning device forms at least two of the plurality of latent images, which are to be formed, with the plurality of light beams and comprises a plurality of light sources, a pre-deflection optical unit that provides predetermined characteristics for the plurality of light beams from the plurality of light sources, one light deflection unit that forms the plurality of latent images with one surface or an integrally processed surface thereof and deflects the plurality of light beams from said pre-deflection optical unit in a predetermined direction, a post-deflection optical unit that causes the plurality of light beams deflection-scanned by the light deflection unit to image on respective corresponding scanned surfaces, so that the plurality of latent images are formed, and an only one horizontal synchronization unit which is on a position of an upstream side of the scanning lines by the light beam to form the latent image formed by the plurality of light beams among the plurality of light beams that passed through at least a portion of the post-deflection optical unit and detects that each light beam to form the latent image formed by the plurality of light beams reached a predetermined position. In the image forming mode, said image writing control unit controls, with respect to each of the plurality of light beams forming one latent image, timing for on-off beginning based on image data for the respective light beams on the basis of timing when the reference light beam passed through a predetermined position of said horizontal synchronization unit and time difference or correction information thereof, which is held in a registration correction mode, between the reference light beam and the light beam when it passes through the predetermined position of said horizontal synchronization unit.

Since beginning timing for image forming of the other light beams is adapted to be controlled by detecting horizontal synchronization timing of one light beam at the time of image formation, as is the case with the above-mentioned present invention, the area required for securing performance as the post-deflection optical unit can be made smaller, and thus, on one hand, securing of image formation properties and so forth can be performed easier and, on the other hand, decreasing in size of optical elements for the image formation and the rotating polygon mirror of the light deflection unit can be achieved.

When all of the light beams are deflected by one deflection surface or the integrally processed deflection surface, relative positions of the plurality of light beams to form different latent images does not vary with respect to each surface, and thus image quality degradation can be avoided even if one light beam is used as a reference light beam.

At the timing other than image forming (outside the imaging area in a sub-scanning direction), deviation amount of illuminating timing between beams for forming respective latent images is defined with respect to each set of beams forming one latent image and, at the time when the image is formed, the deviation amount of defined timing of the other beams is adapted to be shifted with reference to one beam among beams for forming respective latent images.

At the timing of image forming (inside the imaging area in the sub-scanning direction), only one of the plurality of beams is adapted to be inputted to a sensor that outputs a signal when the beam passes through a predetermined position while the other beams are adapted to be off on the sensor. Illuminating timing of the beam served as reference for each when one latent image is formed is adapted to be shifted from the illuminating timing of the one light beam by the deviated timing calculated from the registration sensor output.

Since the timing of only one beam can be observed during image is formed, securing larger imaging area in the scanning optical system is not required in order to measure the timing.

Yet another optical beam scanning device of the invention comprises a plurality of light sources, a pre-deflection optical unit that provides predetermined characteristics for the plurality of light beams from the plurality of light sources, one light deflection unit that deflects the plurality of light beams provided with the predetermined characteristics by the pre-deflection optical unit in a predetermined direction, a post-deflection optical unit that causes the respective light beams deflection-scanned by the light deflection unit to image on corresponding respective scanned surfaces, so that the plurality of latent images are formed, and an horizontal synchronization unit for which the plurality of light beams are provided that passed through at least a portion of the post-deflection optical unit. Furthermore, said pre-deflection optical unit, said light deflection unit, and said post-deflection optical unit operate so that at least two of the plurality of latent images to be formed is formed by the plurality of light beams. Said light deflection unit deflects light beams that form the plurality of latent images by one surface or an integrally processed surface thereof. Said horizontal synchronization unit includes a reflection mirror unit and a detection sensor unit wherein said reflection mirror unit has, with respect to each set of the plurality of light beams forming respective latent images, the same reflecting angle in the main-scanning direction while having respectively different reflecting angles in the sub-scanning direction and the set of the plurality of light beams forming respective latent images is reflected so as to intersect at a position equivalent to said predetermined image surface while said detection sensor unit is provided at an intersecting position of the set of plurality of light beams, which are reflected by said reflecting mirror and form the respective latent images, whereby said detection sensor detects the respective light beams.

The optical beam scanning device is based on the premise in which the horizontal synchronization unit is used with time sharing with respect to each latent image and in order for each that forms the plurality of latent images to measure the relative positions of the plurality of light beams, it is not necessary to vary angles in the main-scanning direction but the same angle is applied. Hence, when the same post-deflection optical unit is used, an image effective field angle (area) can be made larger. Alternatively, the deflection angle for which performance is substantially secured in order to secure the same image effective field angle (area) can be made smaller if compared with prior arts.

Another image forming apparatus of the invention includes an optical beam scanning device wherein a light deflection unit that deflection-scans the light beam emitted from light sources and the post-deflection optical unit that causes the deflection-scanned light beams to image on the scanned surfaces. Moreover, a horizontal synchronization unit for which the light beam that passed at least a portion of said post-deflection optical unit is provided and which detects that the light beam reached a first and a second predetermined position distanced by a predetermined distance in the main-scanning direction, and a registration measuring image writing control unit which controls forming of the latent image of a registration measuring image with reference to said first predetermined position and forming of the latent image of registration measuring image with reference to said second predetermined position are included.

Since the latent image of the registration measuring image with reference to the first predetermined position and the latent image of the registration measuring image with reference to the second predetermined position are formed, a magnification deviation can be calculated from the relative positional relationship of the two latent images thus formed, hence, when the magnification deviation in the main-scanning direction is detected, the installation precision of the registration sensors does not cause a problem.

BRIEF DESCRIPTION OF THE DRAWINGS

FIG. 11 is a flowchart showing in detail adjustment processing as to magnification and positions in main-scanning direction of the black multi-beam.

FIG. 14 is a flowchart showing the details of adjustment processing of the magnification and positions of the main-scanning direction of color-use beam shown in FIG. 8.

FIG. 21 is a flowchart showing details of adjustment processing of magnification and position in the main-scanning of the color-use beams in FIG. 18.

FIG. 22 is a flowchart showing the timing control processing in the main-scanning direction at the time of image writing in FIG. 18.

FIG. 31 is a flowchart showing details of adjustment processing of the magnification and position in the main-scanning direction of the black multi-beam in FIG. 28.

FIG. 32 is a flowchart showing details of adjustment processing of the magnification and position in the main-scanning direction of the color-use beams in FIG. 28.

FIG. 33 is a flowchart showing the timing control processing in the main-scanning direction at the time of image writing in FIG. 28.

DETAILED DESCRIPTION OF THE INVENTION

Hereinafter, with reference to the drawings, a preferred embodiment of an optical beam scanning device and an image forming apparatus of the present invention is disclosed.

(A first Embodiment)

Figure 1:
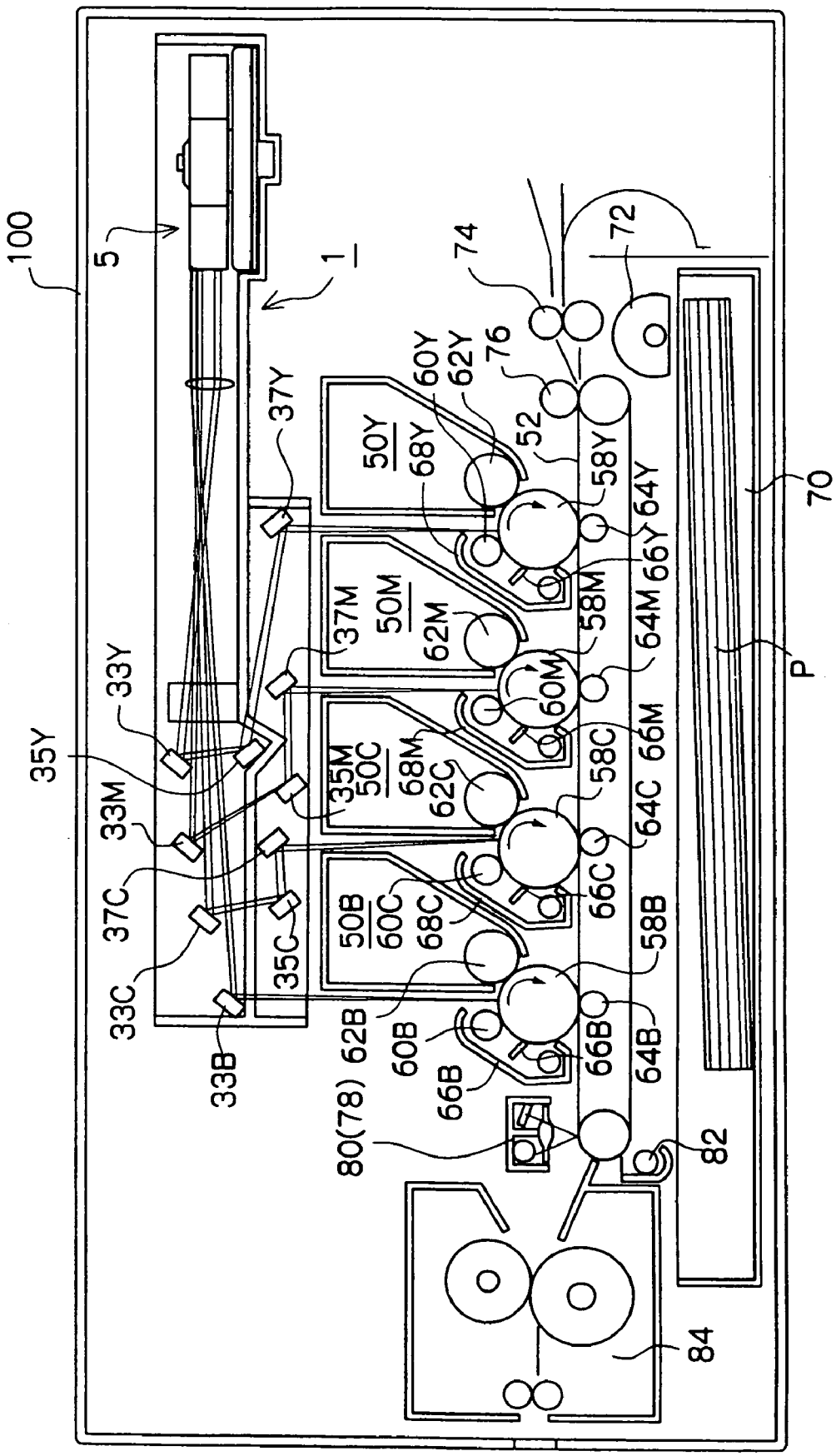
FIG. 1 is a schematic sectional view showing a color image forming apparatus according to a first embodiment.

FIG. 1 is a schematic sectional view showing a color image forming apparatus according to the first embodiment of the invention.

In the image forming apparatus of this type, usually four types of image data as to the respective color components, namely, yellow (Y), magenta (M), cyan (C), and black (B) which are obtained by color separation and four sets of various devices each of which is adapted to form an image with respect to each color component, the sets corresponding to Y, M, C and B respectively, are used. Accordingly, in the succeeding description, the image data with respect to each color component and a device corresponding to each color component are distinguished by assigning symbols of Y, M, C, and B to each reference symbol. The same is applied to FIG. 2 and subsequent drawings.

In FIG. 1, an image forming apparatus 100 has a first, second, third, and fourth image forming unit 50Y, 50M, 50C and 50B, each of the image forming units forming an image with respect to each color component Y, M, C and B obtained by color separation.

The respective image forming units 50 (Y, M, C and B) are arranged below the optical beam scanning device 1 in a line in order of 50Y, 50M, 50C and 50B, the positions of which correspond to emitting positions of the laser beams L (Y, M, C and B) via third deflection mirrors 37Y, 37M, 37C and a first deflection mirror 33B of a multi-beam optical scanning device 1 described later.

Below the image forming units 50 (Y, M, C and B), a transfer belt 52 for transferring images each of which is formed by the image forming units 50 (Y, M, C and B) is provided.

The respective image forming units 50 (Y, M, C and B), include cylindrical drum-shaped photosensitive drums 58 (Y, M, C and B), each of which is adapted to rotate in the direction denoted by each arrow, and to have an electrostatic latent image corresponding to an image formed thereon.

In the space surrounding each of the photosensitive drums 58 (Y, M, C and B), along the rotational direction of respective photosensitive drums 58 (Y, M, C and B), there are arranged charging units 60 (Y, M, C and B)well known in the art, developing units 62 (Y, M, C and B), transfer units 64 (Y, M, C and B), cleaners 66 (Y, M, C and B), and a charge-removing units 68 (Y, M, C and B).

One or two laser beams LY, LM, LC and LB are respectively emitted between respective charging units 60 (Y, M, C and B) and the respective developing units 62 (Y, M, C and B). Each of the one or two laser beams LY, LM, LC and LB becomes one or two beams in a sub-scanning direction on the photosensitive drums 58 guided by the respective mirrors 37Y, 37M, 37C and 33B of the optical beam scanning device 1.

Below the transfer belt 52, there is provided sheet cassette 70 that accommodates the recording medium, namely sheets of paper P.

In one end portion of the sheet cassette 70, there is provided a pick up roller 72 which is adapted to take out the sheets P accommodated in the sheet cassette 70 in a manner that the sheets P are taken out one by one from the uppermost sheet. Between the sending roller 72 and the transfer belt 52, there is provided a resist roller 74.

An adsorption roller 76 is provided on an upstream side than the first image forming unit 50Y in the transfer direction of sheet of paper P, which is adapted to provide a predetermined electrostatic adsorption force onto the sheet of paper P.

a pair of registration sensors 78 and 80 are provided on a downer stream side of the image forming units 50 of the transfer belt 52, which is adapted to detect the position of the image formed on the transfer belt 52 or on the sheet P transferred by the transfer belt 52. (FIG. 1 shows only the rear sensor 80 because this drawing is a sectional view seen from the front.)

A transfer belt cleaner 82 is provided on the transfer belt 52, which is adapted to remove toners adhered on the transfer belt 52 or paper dregs of the sheet of paper P.

A fixing unit 84 for fixing the toner image transferred on the sheet of paper P onto the sheet of paper P is provided on a down streamside than the transfer belt 52 in the transfer direction of the sheet of paper P.

Figure 2:
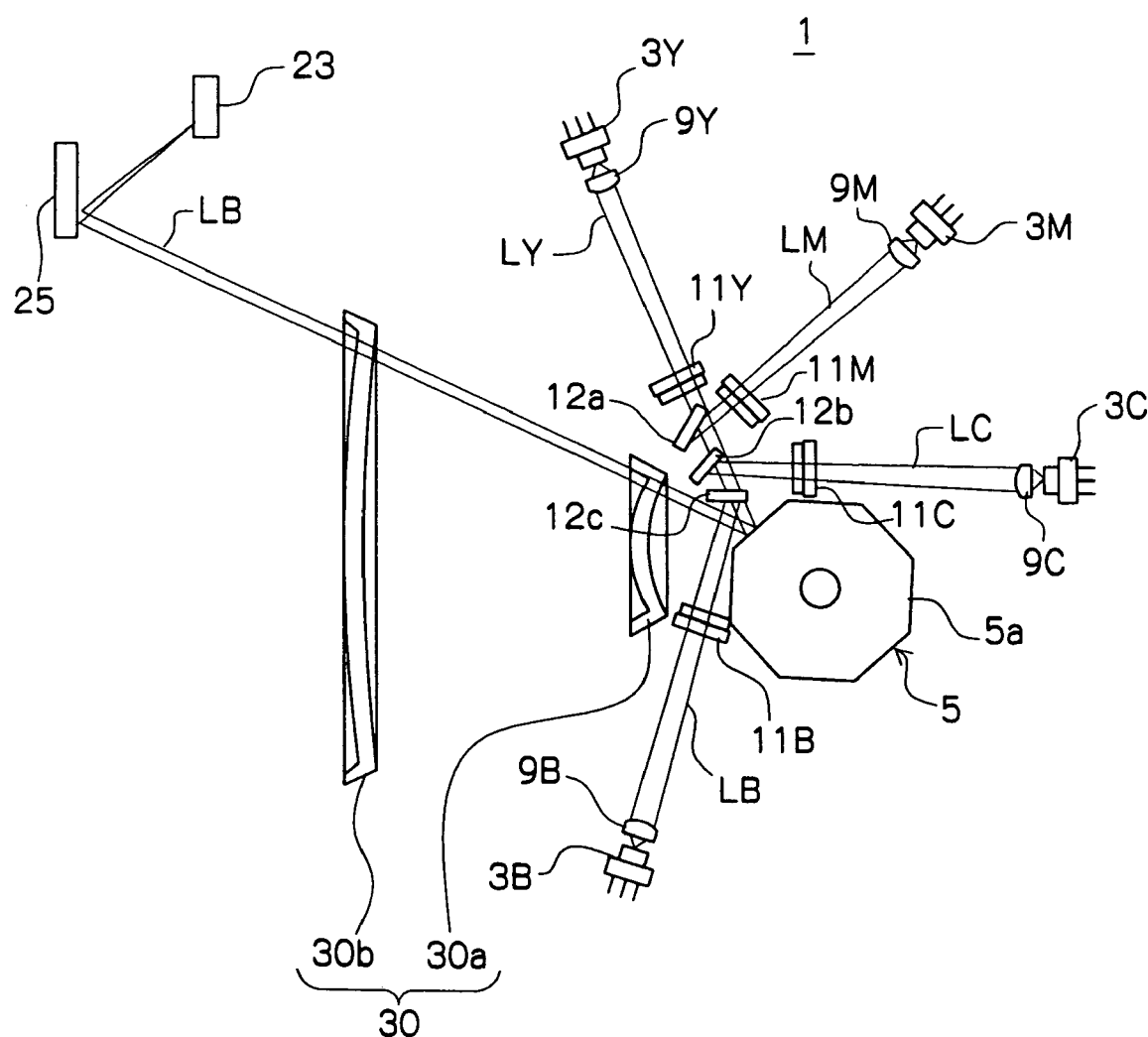
FIG. 2 is a schematic plan view showing a multi-beam optical beam scanning device used for the image forming apparatus shown in FIG. 1.

FIG. 2 is a schematic plan view showing the multi-beam optical beam scanning device 1 for use in the color image forming apparatus 100 shown in FIG. 1.

In FIG. 2, the multi-beam scanning device 1 has only one light deflection unit 5, which serves as a deflecting means adapted to deflect the laser beam emitted from a semiconductor laser serving as a light source toward an image surface disposed at a predetermined position, namely toward the predetermined position of each of the photosensitive drums 58Y, 58M, 58C and 58B with a predetermined linear velocity. Note that in the succeeding description, the direction, in which the laser beam is deflected by the light deflection unit 5, is referred to as a main-scanning direction.

The light deflection unit 5 has a multi mirror body (polygon mirror) 5a, which has a plurality (for example, 8 surfaces) of plane reflection mirrors (surfaces) arranged in the shape of a regular polyhedron and a motor (See FIG. 3) which causes the polygon mirror 5a to rotate in the main-scanning direction at a predetermined speed.

Between the light deflection unit 5 and the image surface, there are provided a pair of post-deflection optical system (an imaging optical system) 30 comprised of a first and a second imaging lens (so-called fθ lens) 30a and 30b each of which provides a predetermined optical characteristic for the laser beam deflected in a predetermined direction by the light deflection unit 5, one horizontal synchronization sensor 23 being adapted to detect the fact that the black laser beam LB, which is emitted from the second imaging lens 30b of the post-deflection optical system 30, reached a predetermined position that is a preceding (at an upstream side) to an area in which an image is written, and only one horizontal synchronization deflection mirror 25 being provided between the post-deflection optical system 30 and the horizontal synchronization sensor 23 and being adapted to reflect a portion of the black laser beam LB passed through at least one lens within the post-deflection optical system 30 toward the horizontal synchronization sensor 23.

Next, a pre-deflection optical system being provided between the semiconductor laser serving as the light source and the light deflection unit 5 is described.

The optical beam scanning device 1 has the semiconductor lasers (light sources) 3 (Y, M, C and B) which are adapted to generate laser beams, each of which corresponds to an image data obtained by color separation with respect to each color component.

A black-use semiconductor laser 3B is a laser array having two illuminating points while each of the other color component semiconductor lasers 3Y, 3M, and 3C is a semiconductor laser having only one illuminating point. More specifically, only the black-use semiconductor laser 3B emits two laser beams LB (when the two laser beams need to be distinguished from each other, symbols LB1 and LB2 are used).

Between the respective semiconductor lasers 3 (Y, M, C, and B) and the light deflection unit 5, there is provided the pre-deflection optical system which is adapted to adjust the sectional beam spot shape into a predetermined shape, or the like.

The divergent laser beams L (Y, M, C and B) emitted from the semiconductor lasers 3 for the respective color components (Y, M, C and B) are provided with predetermined convergence by a finite focal lenses 9 (Y, M, C and B), thereafter the cross sectional shape of each beam is adjusted to a predetermined shape by a stop (not shown). The predetermined convergence only in the sub-scanning direction is further provided for the laser beams L (Y, M, C and B) that passed through the stop by means of cylinder lenses 11 (Y, M, C and B), and thereafter the laser beams L are guided via several mirrors or directly to the light deflection unit 5.

The laser beam LY passed through the yellow cylinder lens 11Y is guided to the light deflection unit 5 via an optical path on which the laser beam LY is not reflected off by the first to third mirrors 12a to 12c. The laser beam LM passed through the magenta cylinder lens 11M is reflected off the first mirror 12a, thereafter passing through the position being deviated from the second mirror 12b, and a third mirror 12c in the sub-scanning direction, so that the laser beam LM is guided to the light deflection unit 5. The cyan-use laser beam LC passed through the cylinder lens 11c is reflected off the second mirror 12b, thereafter passing through the position being deviated from the second mirror 12c in the sub-scanning direction, so that the laser beam LC is guided to the light deflection unit 5. The laser beam LB passed through the black cylinder lens 11B is reflected off the third mirror 12b, so that the laser beam LB is guided to the light deflection unit 5.

Figure 3:
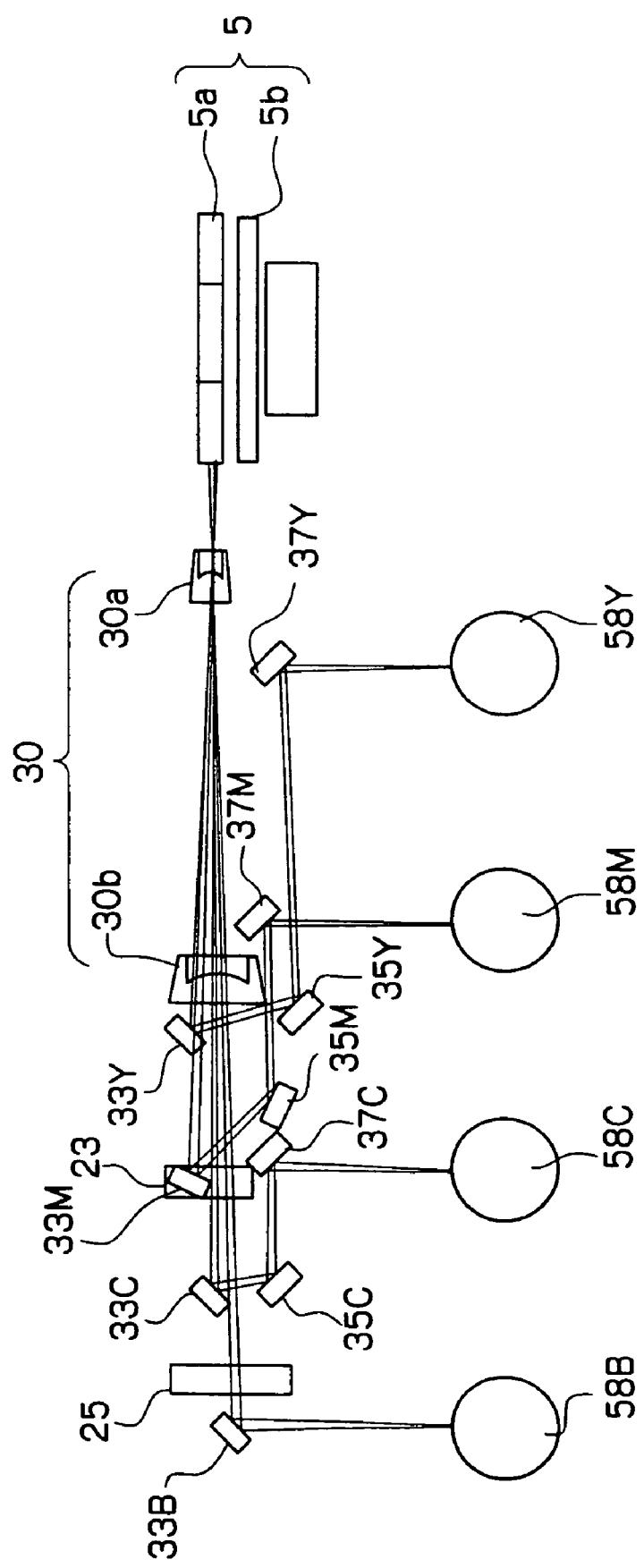
FIG. 3 is a schematic sectional view showing an optical beam scanning device, the sectional view being obtained by cutting the optical beam scanning device at a position in which a deflection angle of a light deflection unit is zero degree.

FIG. 3 shows optical members in the optical beam scanning device 1, which are disposed between the light deflection unit 5 and each of the photosensitive drums 58 (Y. M, C and B), as a sectional view in the sub-scanning direction at a position in which a deflecting angle of the light deflection unit 5 is zero degree.

In FIG. 3, between the second image forming lens 30b of the post-deflection optical system 30 and the image surface, there are provided first deflection mirrors 33 (Y, M, C and B)

that deflects the laser beams L (Y, M, C and B), i.e. one color×2+three colors×1, passed through the second imaging lens 30*b* toward the image surface, second and third deflection mirrors 35Y, 35M and 35C, and 37Y, 37M and 37C that are further adapted to deflect the laser beams LY, LM and LC deflected by the first deflection mirrors 33Y, 33M and 33C.

On the optical path, at a position previous to the first black deflection mirror 33B and a position following to the second deflection mirrors 35Y, 35M and 35C for the other color components, and yet the starting end side of the deflection in the main scanning direction, there is provided a horizontal synchronization deflection mirror 25 which reflects the black-use laser beam LB toward the horizontal synchronization sensor 23.

Laser beams LY, LM and LC of the other color components do not reach the horizontal synchronization deflection mirror 25, so that laser beams LY, LM and LC of the other color components never be reflected toward the horizontal synchronization sensor 23. For example, a configuration may be adopted in which the starting end side of the deflection in the main-scanning direction in the second deflection mirrors 35Y, 35M and 35C for the other color components is extended so that the laser beams LY, LM and LC for the color components other than the black which are directed toward the horizontal synchronization deflection mirror 25 are reflected by the second deflection mirrors 35Y, 35M and 35C, whereby the laser beams LY, LM and LC of the other color components do not reach the horizontal synchronization deflection mirror 25. Alternatively, another configuration may be adopted in which, at the moment before and after the detecting timing of the horizontal synchronization, illumination of the semiconductor lasers 3Y, 3M and 3C for color components other than the black is stopped, whereby the laser beams LY, LM and LC for the color components other than the black are inhibited from reaching the horizontal synchronization deflection mirror 25.

The horizontal synchronization deflection mirror 25 is adapted to reflect only the black-use laser beam (two laser beams) LB, so that one plane mirror can be applied thereto.

Figure 4:
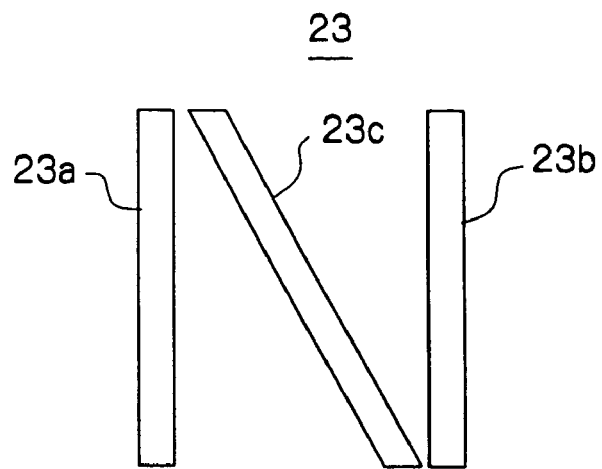
FIG. 4 is a plan view showing a structure of a detecting unit of a horizontal synchronization sensor of the optical beam scanning device shown in FIG. 2.

FIG. 4 is a schematic plan view showing configuration of a detecting unit of the horizontal synchronization sensor 23 of the optical beam scanning device 1 shown in FIG. 2.

The horizontal synchronization sensor 23 has, as detecting units each of which executes photoelectric conversion, a first and second main-scanning beam position detecting units 23*a* and 23*b*, and a sub-scanning beam position detecting unit 23*c*.

Each of the first and second main-scanning beam position detecting units 23*a* and 23*b* is constituted by a rod-shaped photoelectric detecting members, which extend with each other in parallel in the sub-scanning direction, and the distance between the main-scanning beam position detecting units 23*a* and 23*b* is determined to a predetermined length (for example, a length corresponding to 10 dots (pixels) in the case of magnification 1). Note that the first main-scanning beam position detecting unit 23*a* is located farther position (further upstream) from the image effective area when compared with the second main-scanning beam position detecting unit 23*b*.

It is preferred that the positional relationship between the first and second main-scanning beam detecting units 23*a* and 23*b* is accurate, so that members are formed on one chip in a monolithic manner. Similarly, the sub-scanning beam position detecting unit 23*c* is also formed on one chip.

The sub-scanning beam position detecting unit 23*c* is constituted by a rod-shaped photoelectric detecting member and is disposed obliquely against the main scanning and sub-scanning directions in a manner that one end of the sub-scanning beam position detecting unit 23*c* is proximate to the upper end of the first main scanning beam position detecting unit 23*a* while the other end of the sub-scanning beam position detecting unit 23*c* is proximate to the lower end of the sub-scanning direction of the second main-scanning beam position detecting unit 23*b*.

That is, the position in the sub-scanning direction of a laser beam can be detected on the basis of a relationship between the time taken from the moment when a beam spot is detected by a first main-scanning beam position detecting unit 23*a* to the moment when the beam spot is detected by the sub-scanning beam position detecting unit 23*c* and the time taken from the moment when the beam spot is detected by the sub-scanning beam position detecting unit 23*c* to the moment when the beam spot is detected by the second main-scanning beam position detecting unit 23*b*.

Figure 5:
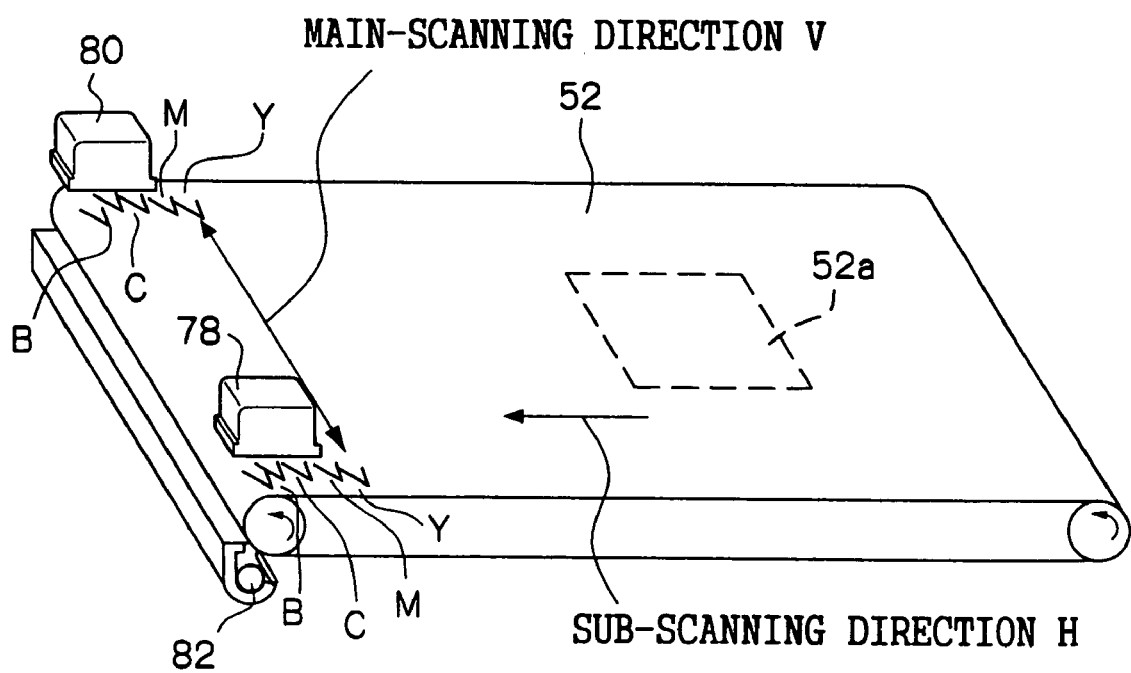
FIG. 5 is a schematic perspective view showing proximity of a transfer belt of the image forming apparatus shown in FIG. 1, the proximity being extracted for explaining a registration correction configuration.

FIG. 5 is a schematic perspective view showing an area in the vicinity of the transfer belt of the image forming apparatus shown in FIG. 1 in order to explain a configuration related to registration correction.

A pair of registration sensors 78 and 80 are provided being distanced at a predetermined distance in the transversal direction of the transfer belt 52, i.e. in the main-scanning direction V. Note that the (virtual) line connecting the centers of the respective registration sensors 78 and 80 is preferably defined so as to be precisely in parallel with the photosensitive drum 58B of the image forming unit 50B.

Each of the registration sensors 78 and 80 is adapted to read registration measuring images, each of which is written at each of both ends of the main-scanning direction of the transfer belt 52.

The writing of registration measuring images, which is explained later in the processing procedure in the processing circuit, is performed in the succeeding manner. Especially, as shown ins FIG. 5, at each end portion in the main-scanning direction (i.e. at an area other than the imaging area in the main-scanning direction), with respect to black element (B), the two patterns are written in, while with respect to other color components (Y, C and M), one pattern is written in.

Figure 6:
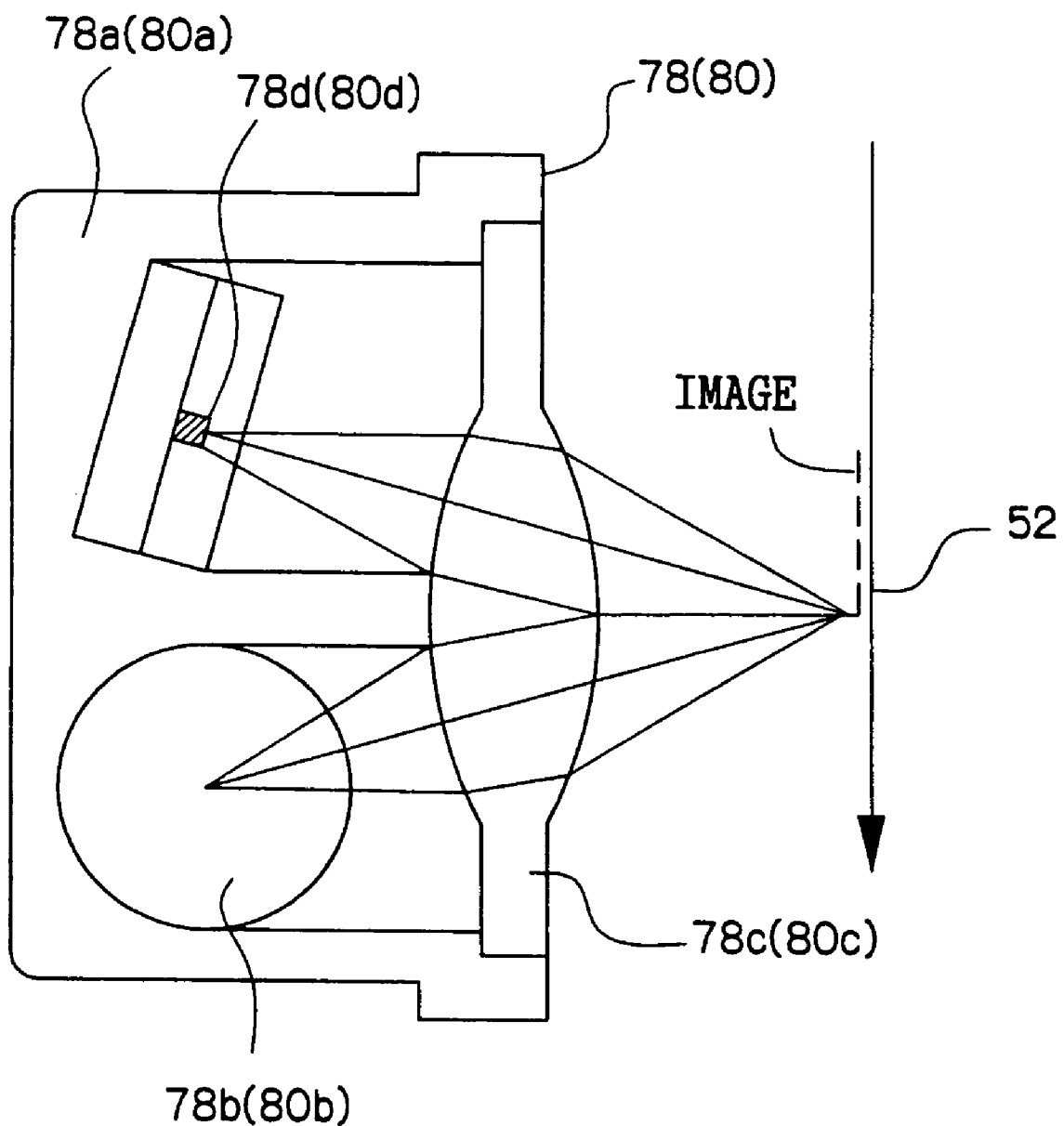
FIG. 6 is a schematic sectional view showing a registration sensor in the image forming apparatus shown in FIG. 1.

FIG. 6 is a schematic sectional view of each of the registration sensors 78 and 80. (Since the sensors 78 and 80 have substantially the same configuration, the sensor 78 is shown in the drawing as a representative one.) The registration sensor 78 includes a housing 78*a*, a reference-light light source 78*b* which is disposed at a predetermined position of the housing 78*a* and illuminates light including predetermined wavelengths (at least wavelengths of proximate to 450, 550 and 600 nm) onto the image on the transfer belt 52, a convex lens 78*c* which causes the light emitted from the reference-light light source 78*b* to converge on the image on the transfer belt 52 while causing the light reflected from the image to image on the photo sensor 78*d*, and a photo sensor (light-receiving unit) 78*d* which is adapted to detect the reflected light from the converged image by the convex lens 78*c* in order to convert the reflected light into an electric signal and so on. The photo sensor (light receiving unit) 78*d* has, for example, a light receiving surface of approximately 7 μm×7 μm. Specifically, the photo sensor (light receiving unit 78*d* is a micro sensor which is denoted by hatching in FIG. 6 and is used to read data of micro width in the main-scanning direction.

The above-mentioned wavelengths included in the light emitted from the light source 78*b* are peak wavelengths of absorption spectrum distribution of the toners of cyan (C), yellow (Y), and magenta (M), respectively, the wavelengths being secured for maintaining detection sensitivity to the respective toners. A lateral magnification of the convex lens 78c is "−1"

Figure 7:
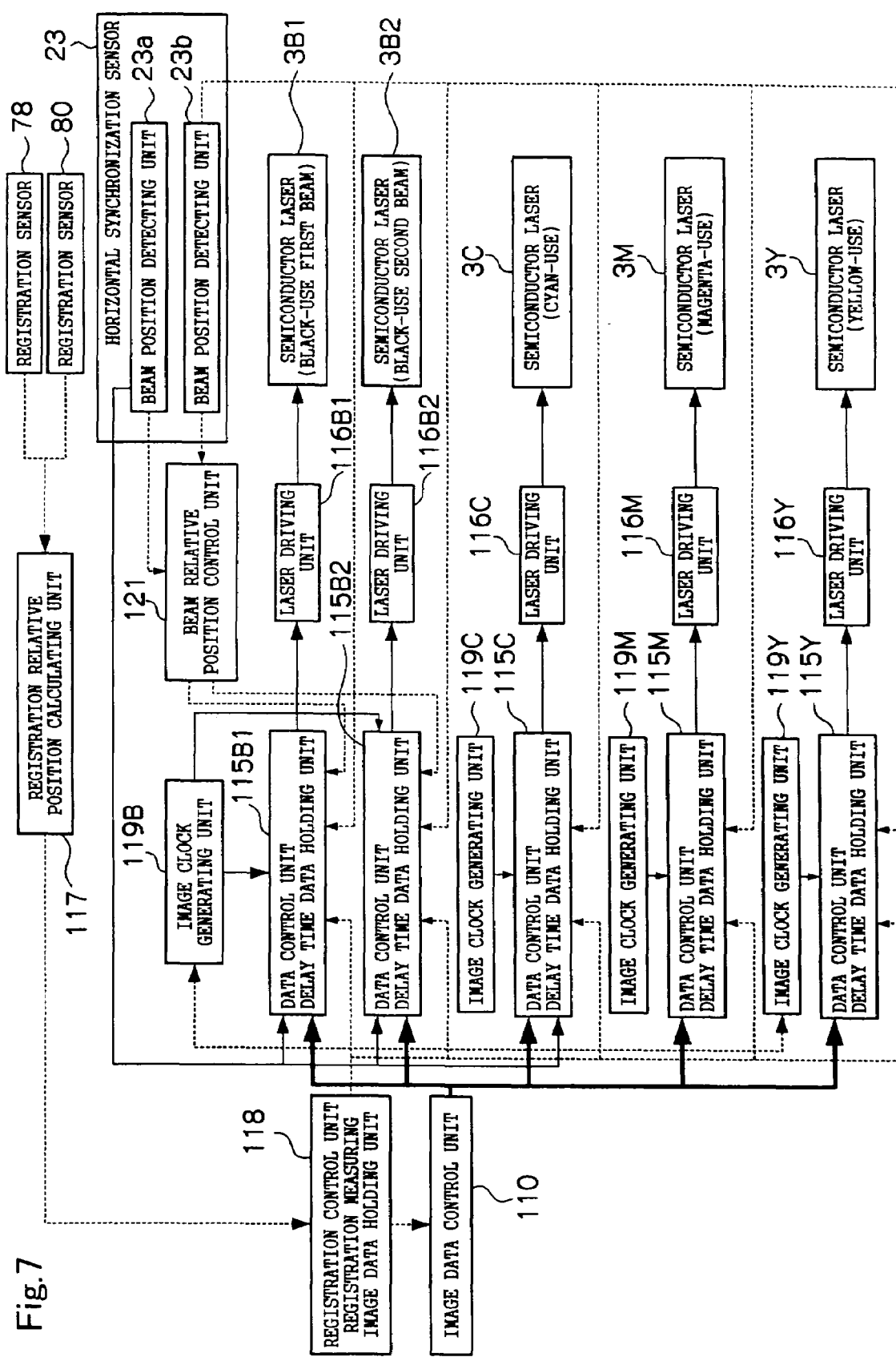
FIG. 7 is a schematic block diagram showing processing circuit for controlling image forming operations of the image forming apparatus shown in FIG. 1.

FIG. 7 is a schematic block diagram of the processing circuit which controls image forming operations of the image forming apparatus 100 shown in FIG. 1. FIG. 7 shows only such portion that relates to the optical beam scanning device from the viewpoint of obtaining information required for timing control at the time of image forming in the main-scanning direction.

The processing circuit performs, in accordance with the procedure shown in FIG. 8 as later described, control of beam spacing between two laser beams forming a black latent image and black-use registration, color registrations for yellow, magenta and cyan and so on. Note that, in FIG. 7, a "dot and dash line" shows data flow for controlling the main-scanning directional positions among a plurality of beams which form one latent image and a "dot line" shows data flow for adjusting the 10 relative positions of the latent images. A solid line shows the data flow when the image is written in.

The image forming apparatus 100 includes an image data control unit 110 which is interconnected via bus lines to the data control units 115Y, 115M, 115C, 115B1, and 115B2, each of which corresponds to each color component.

For example, the image forming apparatus of the first embodiment has a transfer mode in which a resolution in the sub-scanning direction can be at least doubled in such color component as the black element to which a human visual sensitivity property is higher than the other color components. (For example, if the black color component is 1200 dpi, the other color components are 600 dpi.) This doubled resolution is realized by employing two laser beams only for the black element. That is to say, when compared with the other laser beams, doubled amount of the laser beam is illuminated only for the black element.

Accordingly, as the data control unit, two date control units 115B1 and 115B2 are provided with respect to only the black element.

The image data control unit 110 is constituted chiefly by an image control CPU and a main control CPU. The image data control unit 110 controls operations of the mechanical elements of the image forming apparatus 100 other than the optical beam scanning device and voltage values applied to electrical elements or current flow amount and so on.

With respect to the black element, the image data control unit 110 provides, for example, black image data of lines of odd numbers for the data control unit 115B1, while the black image data of lines of even numbers for the data control unit 115B2.

Each data control unit 115 (Y, M, C, B, and B2) accommodates therein an image memory and a delay time data holding unit or the like, whereby inputted image data are provided for corresponding laser driving units 116 (Y, M, C, B1 and B2) at timing delayed by a delay time period, which is described later in the description of operation, and yet on the basis of an image clock generated by corresponding image clock generating units 119 (Y, M, C and B1 and B2).

Each image clock generating unit 119 (Y, M, C and B) is constituted by, for example, a VCO (voltage control oscillator) and adapted to vary a frequency of the image clock at a range of several percent. Note that, with respect to the black element, two data control units 115B1 and 115B2 are provided for emitting the first and second laser beams LB1 and LB2 associated with the black element while, as the image clock generating unit, an image clock generating unit 119B is provided which provides a frequency common to the both data control units 115B1 and 115B2 and in which only phase is independently controlled.

The respective laser driving units 116 (Y, M, C and B1 and B2) are units which are adapted to drive the corresponding semiconductor lasers 3 (semiconductor laser chip) (Y, M, C, B1 and B2) in accordance with inputted image data. As described above, the two semiconductor laser chips 3B1 and 3B2, both being associated with the black element are constituted as one element.

An output of one of the main-scanning beam position detecting unit 23b (23a is acceptable) in the horizontal synchronization sensor 23 is adapted to be provided for all of the data control units 115 (Y, M, C, B1 and B2) as a horizontal synchronization reference.

The outputs of the first and second main-scanning position detecting units 23a and 23b in the horizontal synchronization sensor 23 are adapted to be provided for a beam relative position control unit 121.

The beam relative position control unit 121 is a unit that is adapted to obtain information of relative positions in the main-scanning direction of the two laser beams of the black element. The information is provided for the black data control units 115B1 and 115B2.

While a signal line is omitted, the outputs of the horizontal synchronization sensor 23 (the outputs of the first and second main-scanning beam position detecting units 23a and 23b and the output of the sub-scanning beam position detecting unit 23c) are provided for the image data control unit 110, so that the data thus provided is utilized for positional control in the sub-scanning direction and so on. Since the characteristic feature of the first embodiment lies in the timing control in the main-scanning direction, the timing control in the sub-scanning direction is omitted in FIG. 7 as appropriate.

The outputs of the two registration sensors, namely the registration sensors 78 and 80, are provided for to a registration relative position calculating unit 117. The registration relative position calculating unit 117 is a unit which is adapted to obtain relative positions of two sensor outputs on the same horizontal scanning line, and the obtained output is provided for a registration control unit 118.

The registration control unit 118, which include therein a registration measuring image data holding unit, is adapted to provide registration measuring image data for the image data control unit 110 so as to cause the registration measuring image to be transferred on the transfer belt 52 and to form registration correction information on the basis of the output and so on from the registration relative position calculating unit 117. The registration control unit 118 causes a part of the registration correction information (for example, clock frequency) to be provided for image clock generating units 119 (Y, M, C and B) and the other registration correction information (for example, delay time for compensating a lateral displacement amount in the main-scanning direction) to be provided for the data control units 115 (Y, M, C, B1 and B2), whereby output timing of the image data supplied from the image control units 115 (Y, M, C, B1 and B2) is adjusted.

Next, operations associated with timing control in the main-scanning direction of the image forming unit 100 of the first embodiment is described.

The image forming apparatus 100 is operable in two or three modes such as an image forming (normal) mode in which an image is formed on the sheet of paper P transferred by means of the transfer belt 52, a registration correction (adjustment) mode in which an image is directly formed on the transfer belt 52, and the other mode in which additionally judgment of order of incidence only for the black multi-beams is performed in some cases.

Figure 8:
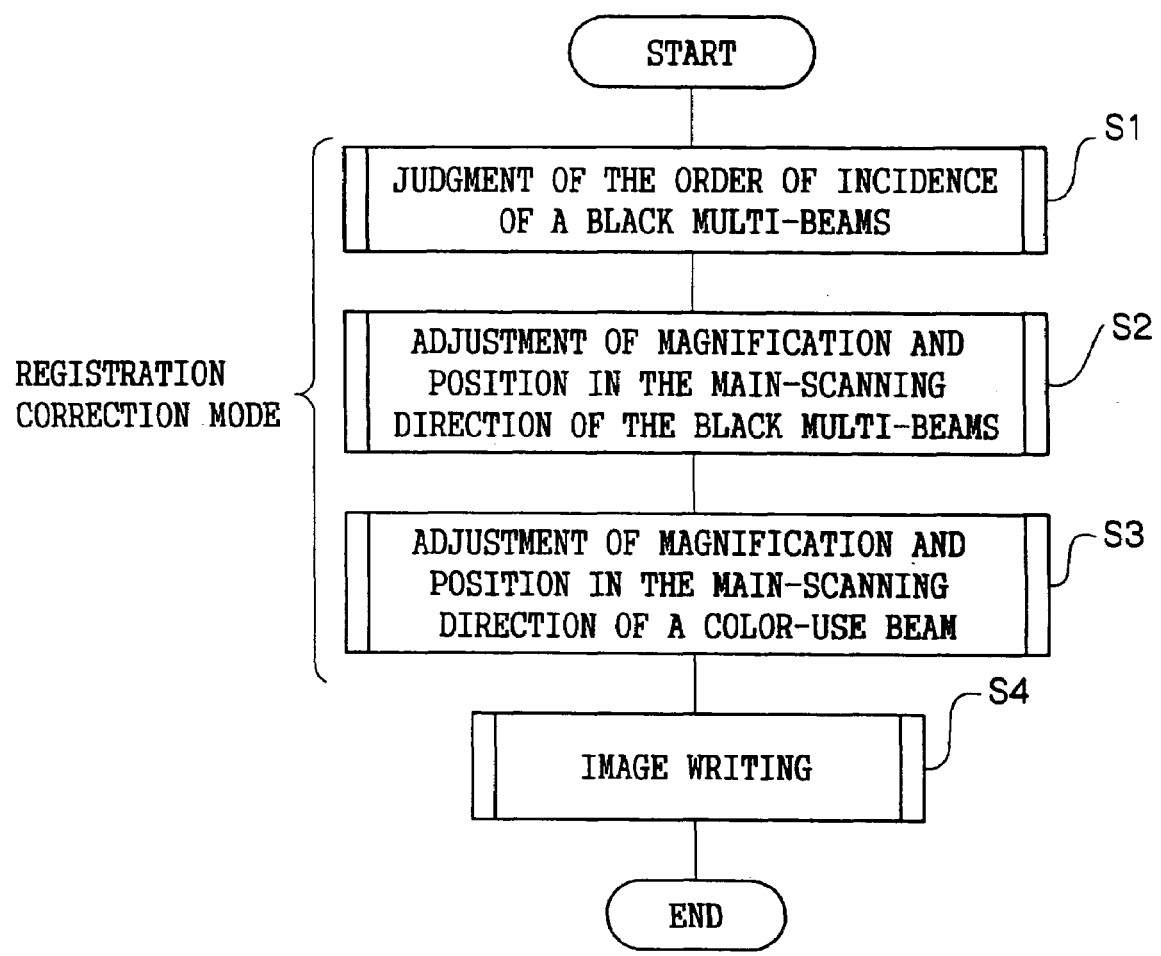
FIG. 8 is a flowchart showing a flow of timing control operation of the image forming apparatus shown in FIG. 1.

In general, as shown In FIG. 8, after the processing in the registration correction mode (S1 to S3) is performed, the processing proceeds to the image writing processing in the image forming mode (S4).

In the case of the first embodiment, as shown in FIG. 8, the processing in the registration correction mode includes judgment processing of the order of incidence of the black multi-beams (S1), adjustment processing of magnification and main-scanning directional position of the black multi-beams (S2) and the adjustment processing of magnification and main-scanning directional position of the color-use beam (S3).

Figure 9:
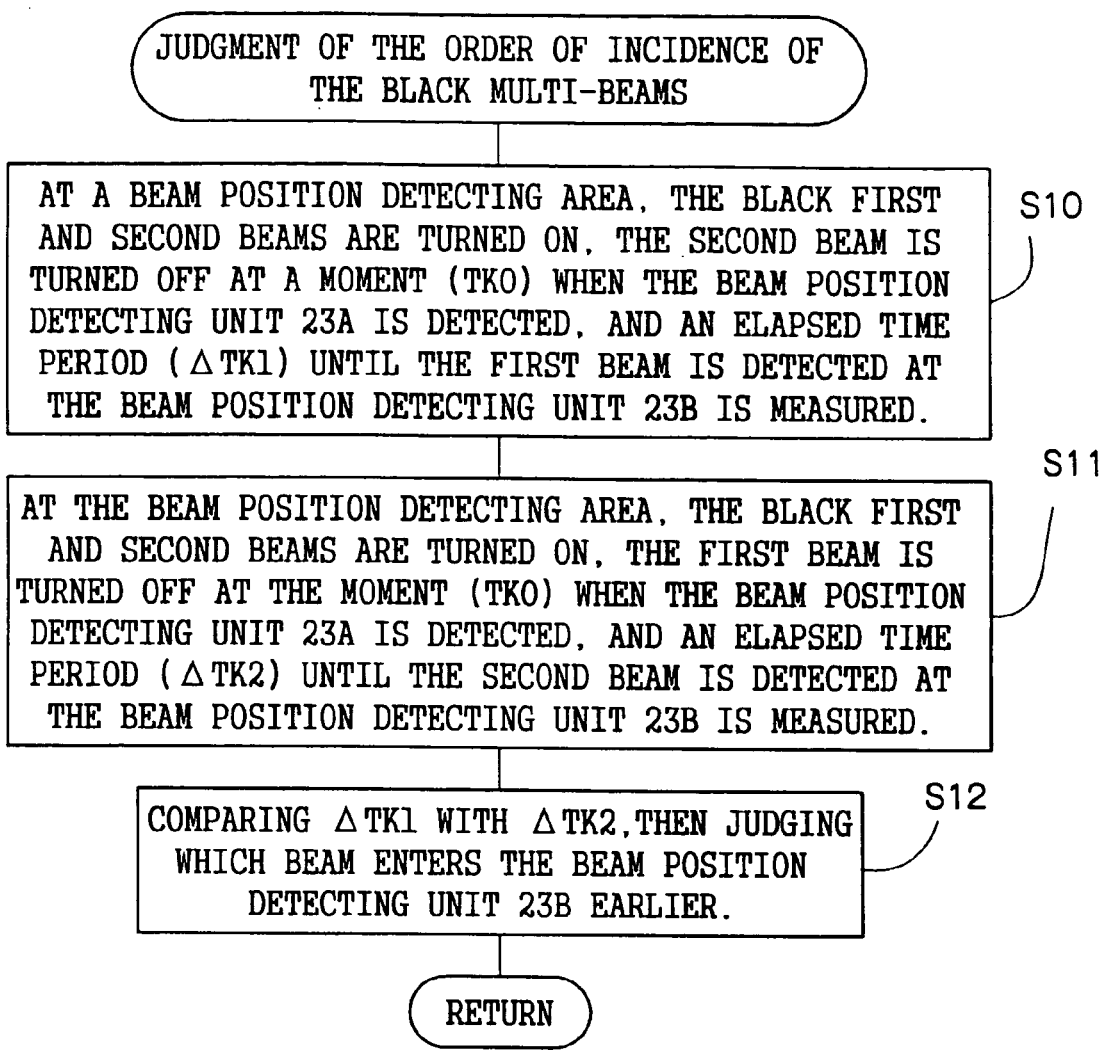
FIG. 9 is a flowchart showing in detail judgment processing as to an order of incidence of black multi-beams in FIG. 8.

FIG. 9 shows the details of the judgment processing of the order of incidence of the black multi-beams (S1). In the judgment processing of the black multi-beams, the laser beams of the other color components never be emitted.

First, in a beam position detecting area, the black-use first and second laser beams LB1 and LB2 are emitted from the semiconductor lasers 3B1 and 3B2; emission of the second laser beam LB2 is stopped at a moment Tk0 when either laser beam is detected by the first main-scanning beam position detecting unit 23a of the horizontal synchronization sensor 2 (regardless of whether the detected laser beam is the black-use first laser beam LB1 or black-use second laser beam LB2); and then a time period ΔTk1 is measured, the time period ΔTk1 being a period of time taken from the moment Tk0 to the moment when the first laser beam LB1 is detected by the second main-scanning beam position detecting unit 23b in the horizontal synchronization sensor 23 (S10).

Next, in the beam position detecting area, the black-use first and second laser beams LB1 and LB2 are emitted from the semiconductor lasers 3B1 and 3B2; emission of the first laser beam LB1 stopped at the moment Tk0 when a laser beam is detected by the first main-scanning beam position detecting unit 23a in the horizontal synchronization sensor 23 (regardless of whether the detected laser beam is the black-use first laser beam LB1 or black-use second laser beam LB2); and then a time period ΔTk2 is measured, the time period ΔTk2 being a period of time taken from the moment Tk0 to the moment when the second laser beam LB2 is detected by the second main-scanning beam position detecting unit 23b in the horizontal synchronization sensor 23(S11).

Thereafter, the two time periods ΔTk1 and ΔTk2 are compared, and then it is judged which of the black-use first laser beam LB1 or black-use second laser beam LB2 firstly reaches the second main-scanning beam position detecting unit 23b in the horizontal synchronization sensor 23 (S12).

Figure 10:
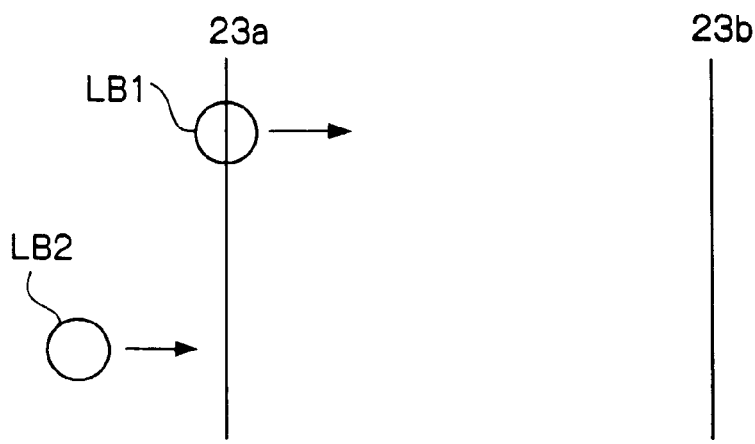
FIG. 10 is a schematic plan view showing an example of a positional relationship among black multi-beams, the view illustrating judgment processing on the order of incidence of the black multi-beams.

For example, assuming that, as shown in FIG. 10, the first laser beam LB1 proceeds in the main-scanning direction in comparison with the second laser bean LB2, the time period ΔTk1 at the processing S10 is a time period in which the first laser beam LB1 move between the first and second main-scanning bean position detecting units 23a and 23b, while the time period ΔTk2 at the processing S11 is a time period in which the second laser beam LB2 moves from the position shown in FIG. 10 to the second main-scanning beam position detecting unit 23b, so that the time period ΔTk1 is shorter. Similarly, when the second laser bean LB2 proceeds in the main-scanning direction in comparison with the first laser beam LB1, the time period ΔTk2 is shorter. Accordingly, it can be determined which of the laser beam LB1 and LB2 proceeds by comparing the time period ΔTk1 with the time period ΔTk2.

Note that in the succeeding description of the first embodiment, the black-use laser beam that proceeds in the main-scanning direction is occasionally referred to as a preceding black laser beam while the black-use laser beam which falls behind in the main-scanning direction is occasionally referred to as a succeeding black laser beam.

FIG. 11 shows details of the adjustment processing of magnification and main-scanning directional positions of the black multi-beams.

First, in the beam position detecting area, the preceding black laser beam is emitted from the specific semiconductor laser 3B1 or 3B2; emissions of the other laser beams (namely, the succeeding black laser beam and the other color component laser beams) are stopped; and a reference time, which is a point of time when the preceding black laser beam passes through the first main-scanning detecting unit 23a of the horizontal synchronization sensor 23, is measured. Next, the succeeding black laser beam is emitted from the specific semiconductor laser 3B2 or 3B1; emissions of the other laser beams (namely, the preceding black laser beam and the other color component laser beams) are stopped; a reference time, which is a point of time when the succeeding black laser beam passes through the first main-scanning beam position detecting unit 23a of the horizontal synchronization sensor 23, is measured. Thereafter, by means of the preceding black laser beam and succeeding black laser beam, writing of the registration measuring images is effected from a moment when a previously (or initially) set margin ΔTk0 elapses from the respective reference times (S20).

Also, in the beam position detecting area, the preceding black laser beam is emitted from the specific semiconductor laser 3B1 or 3B2; emissions of the other laser beams (namely, the succeeding black laser beam, and the other color component laser beams) are stopped; and a reference time, which is a point of time when the preceding black laser beam passes through the second main-scanning beam position detecting unit 23b in the horizontal synchronization sensor 23, is measured. Next, the succeeding black laser beam is emitted from the specific semiconductor laser 3B2 or 3B1; emissions of the other laser beams (namely, the preceding black laser beam and the other color component laser beams) are stopped; a reference time, which is a point of time when the succeeding black laser beam passes through the first main-scanning beam position detecting unit 23b of the horizontal synchronization sensor 23, is measured. Thereafter, by means of the preceding black laser beam and succeeding black laser beam, writing of the registration measuring images is effected from a moment when the previously (or initially set margin ΔTk0 elapses from the respective reference times (S21).

By way of the above described operation, as show in FIG. 5, with respect to the black element (B), two patterns are written in each of the upstream side and downstream side as registration measuring image; one of the two patterns being written with reference to the first main—scanning beam position detecting unit 23a, the other being written with reference to the second main-scanning beam position detecting unit 23b.

Note that, the registration correction mode is executed at a is point of time when power of the equipment is activated and when a predetermined number of sheets are printed or temperature change exceeds a predetermined amount. In the mode, the sending roller 72 that feeds the sheet of paper P from the cassette 70 and the fixing unit 84 are stopped and the writing onto the transfer belt 52 is executed.

Figure 12:
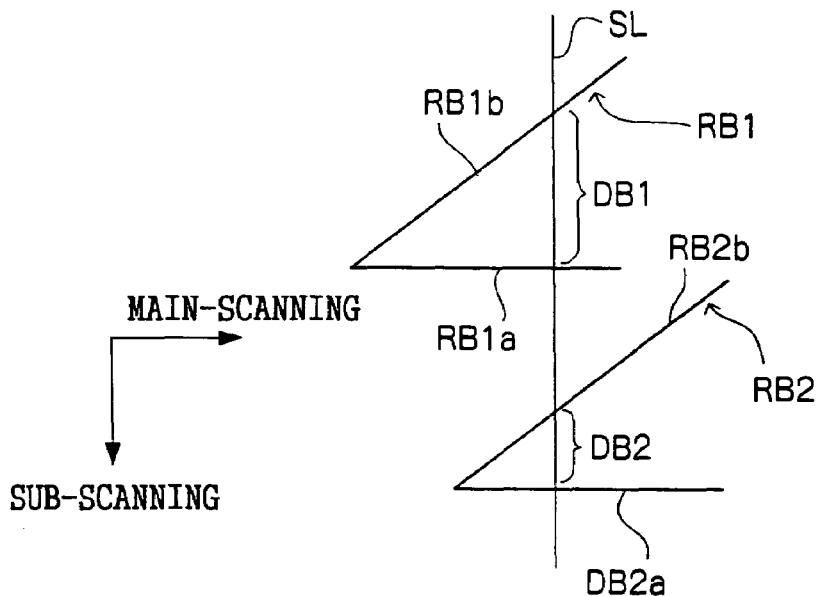
FIG. 12 is a schematic plan view showing an example of two patterns with respect to black element at an upstream side (also similar with respect to a downstream side) in the main-scanning direction.

FIG. 12 is a schematic plan view that shows examples of the two patterns with respect to black element on the upstream side (similar on the downstream side) in the main-scanning direction.

In FIG. 12, the first pattern RB1 is written with reference to the position of the first main-scanning beam position detecting unit 23a while the second pattern RB2 is written with reference to the position of the second main-scanning beam position detecting unit 23b.

Each pattern RB1, RB2 is comprised of a pattern portion RB1a, RB2a extending in the main-scanning direction and a pattern portion RB1b and RB2b each of which makes an acute angle with the pattern portion RB1a, RB2a. Note that the straight line SL extending in the sub-scanning direction does not constitutes the pattern but shows, for reference, positions that are read by the registration sensor 78 (or 80).

Note that magnification deviation and lateral displacement in the main-scanning direction can be detected from the distances DB1 and DB2 with respect to the patterns RB1 and RB2 obtained from the output of the registration sensor 78 (80).

When the writing of the registration measuring image is completed, time difference between read times at the two registration sensors 78 and 80 or the like are obtained, and on the basis of the time difference, the deviation magnification of the first and second laser beams LB1 and LB2 in the main-scanning direction and the lateral displacement amount in the main-scanning direction are calculated, and an image clock corresponding to the deviation magnification is obtained, and further the above-mentioned set margin $\Delta Tk0$ is updated to time corresponding to the lateral displacement amount in the main-scanning direction (S22).

The image clock generating unit 119B of black element is caused to set a new image clock frequency (S23); and also the delay time data holding unit in the data control units 115B1 and 115B2 for the black element (S24) is caused to hold the set margin $\Delta Tk0$.

Hereinafter one example of the method of calculating the deviation magnification in the main-scanning direction and the lateral displacement amount in the main-scanning direction is described.

Figure 13:
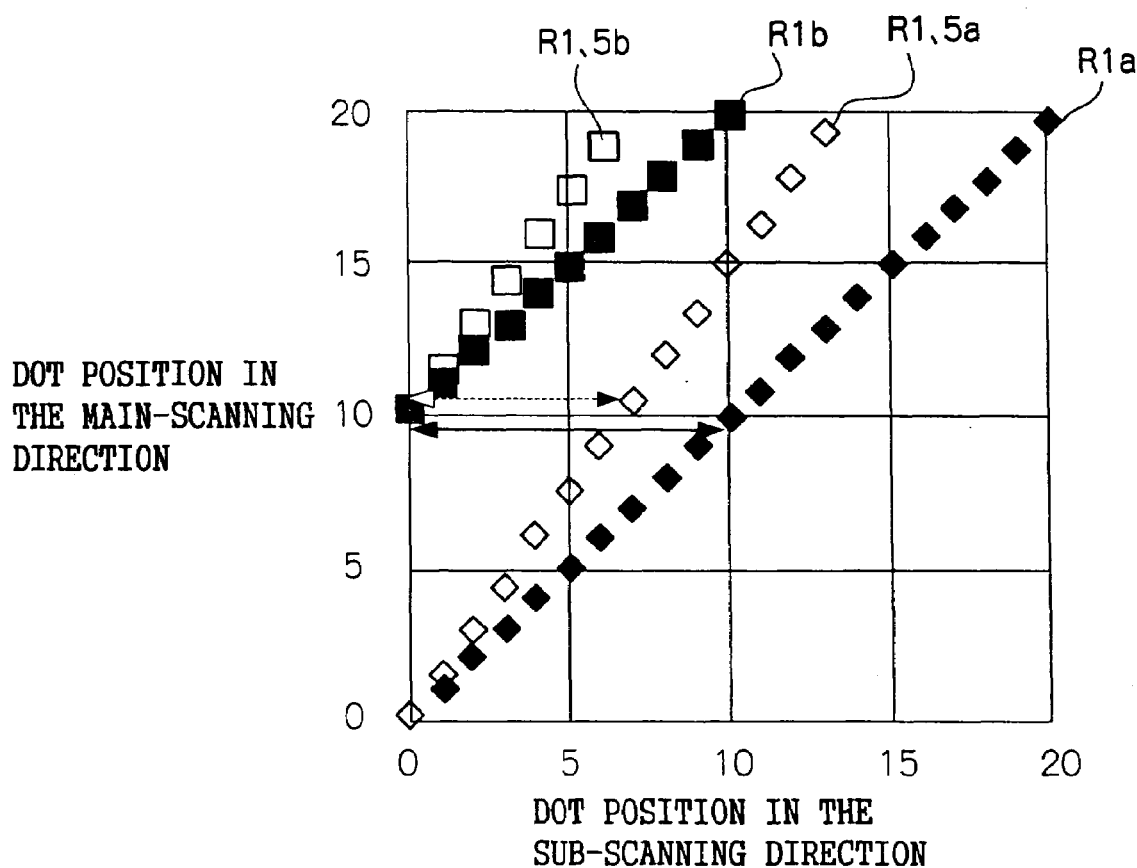
FIG. 13 is a schematic plan view showing a relationship between the main-scanning direction magnification and a written-out registration measuring image.

FIG. 13 is a schematic plan view showing the relationship between the magnification in the -main-scanning direction and the written-out registration measuring image.

The two patterns (registration measuring image) R1a and R1b which are written-out in such a manner that the image in the main-scanning direction is displaced by one dot with respect to each one dot in the sub-scanning direction (the magnification in the main-scanning direction is one) with reference to the timing in which the laser beam passes the first and second main-scanning beam position detecting units 23a and 23b in the horizontal synchronization sensor 23 are displaced, with respect to the same horizontal line, by the distance between the first and second main-scanning beam position detecting units 23a and 23b (in FIG. 13. ten dots amount) and the same distance is displaced in the sub-scanning direction.

If the magnification in the main-scanning direction is changed to 1.5, with reference to the timing when the laser beam passes the first and second main-scanning beam position detecting units 23a and 23b, the written-out two patterns (registration measuring image) change to patterns R1.5a and R1.5b which are denoted by the outline dots (i.e., white square-shaped dots) in FIG. 13. In the two patterns R1.5a and R1.5b obtained when the magnification in the main-scanning direction is 1.5, the distance in the main-scanning direction is the same as the distance in the case where the magnification in the main-scanning direction is 1 (one), whereas the distance in the sub-scanning direction becomes ⅔ (i.e., two third) (=1÷1.5) the length obtained in the case where the magnification in the main-scanning direction is 1 (one).

These facts show that, with reference to the timing when the laser beam passes through the first and second main-scanning beam position detecting units 23a and 23b, the distance between the written-out two patterns in the sub-scanning direction is determined on the basis of the magnification in the main-scanning direction. The distance in the sub-scanning direction can be determined by the output of the registration sensor 78 or 80.

Hereinafter, the method of calculating the magnification in the main-scanning direction and so on is described using numerical values.

A dot position in the sub-scanning direction moves by the distance p that is determined by its resolution each time scanning is executed. On the other hand, as to the main-scanning direction, with respect to the image clock of image frequency of $1/\Delta t$, where one cycle is determined to a time period $\Delta t = p/v\ s0$, namely a time period in which the scanning proceeds at the designated speed v s0 of the scanning line by the distance p, each time one-time sub-scanning proceeds, the semiconductor lasers 3B1 and 3B2 are turned on at a moment delayed by a time interval $\alpha \times \Delta t$, whereby the registration measuring image is written in. (here, $\alpha$ denotes magnification in the main-scanning direction, and basically $\alpha$ is basically determined to $\alpha=1$ in the case of FIG. 13.)

Here, the main-scanning direction is denoted by y, the sub-scanning direction is denoted by z, and the image starting points are denoted by y0, z0, respectively, the position z in the sub-scanning direction is represented by $L \times P + z0$, the position y in the main-scanning direction is represented by v $s0 \times L \times \alpha \times \Delta t + y0$, where L represents an integer which denotes order of dots in the pattern of the registration measuring image.

When an image is drawn with reference to timing when a laser beam passes through the first and second main-scanning beam position detecting units 23a and 23b, each position is represented by the succeeding equations:

$$z1=L \times p+z10\ z2=L \times p+z20 \qquad (1)$$

$$y1=v\ s0 X L\ X\alpha X\Delta t+y10$$

$$y2=v\ s0 X L\ X\alpha X\Delta t+y20 \qquad (2)$$

When L is eliminated from the above equations (1) and (2), the equation (3) is obtained. Then, using the equation (3), the spacing in the z direction (i.e. sub-scanning direction) at the ym that is a predetermined position of y (a predetermined position in main-scanning direction), the succeeding equation (4) is obtained.

$$z1 - z10 = (y1 - y10) \times p/v\ s0 \times \alpha \times \Delta t \qquad (3)$$

$$z2 - z20 = (y2 - y20) \times p/v\ s0 \times \alpha \times \Delta t$$

$$\begin{aligned} z2 - z1 = &(ym - y20) \times p/v\ s0 \times \alpha \times \Delta t + z20 - \\ &(ym - y10) \times p/v\ s0 \times \alpha \times \Delta t - z10 \\ &(y10 - y20) \times p/v\ s0 \times \alpha \times \Delta t + \\ &(z20 - z10) \end{aligned} \qquad (4)$$

If the scanning speed of the laser beam is increased by β-fold, that is, when the vs=β×v s0 is established, due to thermal expansion and/or change in refractive index in the post-deflection optical system, change in wavelength in the semiconductor laser of the light source, or change in the distance between the post-deflection optical system and the image surface caused under the influence of temperature, the equation (5) is established in place of the equation (4).

$$z2 - z1 = (y10 - y20) \times p/\beta \times v\ s0 \times \alpha \times \Delta t + (z20 - z10) \quad (5)$$

In order to conform the equation (5) with the original equation (4), it is known that $\Delta t$ in the equation (5) is replaced by the $\Delta t/\beta$. In other words, this is known that it is sufficient for the cycle of the image clock to be changed from $\Delta t$ to $\Delta t/\beta$.

By subtracting the right side of the equation (4) from the right side of the equation (5), it is known that displacement to a designated value by the distance $\delta z$ shown in equation (6) occurs.

$$\delta Z = (y10 - y20) \times p/\beta x\ v\ s0 \times \alpha \times \Delta t - (y10 - y20) \times \quad (6)$$
$$p/v\ s0 \times \alpha \times \Delta t$$
$$= (1/\beta - 1) \times (y10 - y20) \times p/v\ s0 \times \alpha \times \Delta t$$

When, on the assumption that the speed of the transfer belt is Vp, the distance $\delta z$ is transformed to the time $\delta t$, the equation (7) is obtained. Note that, the equation (7) is adjusted by also employing the above-mentioned relationship of the $\Delta t=p/v\ s0$.

$$\delta t = \delta z/vp \quad (7)$$
$$= (1/\beta - 1) \times (y10 - y20) \times p/vp \times v\ s0 \times \alpha \times \Delta t$$
$$= (1/\beta - 1) \times (y10 - y20)/vp \times \alpha$$

If equation (7) is solved with respect to $1/\beta$, equation (8) described below is obtained. Equation (8) shows that, if the time lag $\delta t$ between the designed value and the time when this pattern passes at a point in a predetermined y direction, namely, a point in the main-scanning direction is known, it is sufficient that time of one cycle of the image clock is multiplied by the magnification (i.e. $1/\beta$) obtained by equation (8) (as a frequency of the image clock, it is sufficient to be multiplied by a reciprocal of equation (8), namely, by $\beta$-fold).

$$(1/\beta) = vp\ X\alpha/(y10 - y20) + 1 \quad (8)$$

As is clearly known from equation (8), the time $\delta t$ does not depend on the position (ym) in the main-scanning direction, so that, even when the registration sensors 78 and 80 are located inaccurately, the magnification can be measured accurately.

With respect to the actual registration measuring image, it is impossible to write an image at the same position in the sub-scanning direction with reference to the timing, in which the light beam is detected at different detecting positions (at the positions of the first and second main-scanning beam position detecting units 23a and 23b). Accordingly, at first, a registration measuring image is written with reference to the point of time, in which the light beam passes through the first main-scanning beam position detecting unit 23a, thereafter, registration measuring image is written with reference to the point of time, in which the light beam passes through the second main-scanning beam position detecting unit 23b. As a result, the above-mentioned patterns RB1, RB2 as shown in FIG. 12 are written.

The inclination amount of the scanning line is measured by; image-forming the patterns of the RB1a and RB2a in FIG. 12, which originally extend in the main-scanning direction, at the upstream and downstream sides, thereafter measuring the patterns thus formed at the registration sensors 78 and 80 provided on two positions, and on the basis of the time lag of detected times, measuring is performed.

The timing lag in the sub-scanning direction can also be detected from the pattern read timing of the pattern portions RB1a and RB2a extending straightly in the main-scanning direction in FIG. 12.

The lateral displacement amount in the main-scanning direction can be obtained by measuring the pattern of the pattern RB1b and RB2b at the upstream and downstream sides of the main-scanning direction, which patterns are inclined in the main-scanning and sub-scanning directions in FIG. 12.

FIG. 14 shows details of the adjustment processing of magnification and position in the main-scanning direction of the color-use beam in FIG. 8.

First, in the beam position detecting area, the preceding black laser beam is caused to be emitted from the specific semiconductor laser 3B1 or 3B2; emissions of the other laser beam (i.e. the succeeding black laser beam and the laser beams of the other color components) are stopped; at the moment when a previously (or initially) set margin $\Delta TY0$, $\Delta TM0$, or $\Delta TC0$ elapses from the moment when the first main-scanning beam position detecting unit 23a of the horizontal synchronization sensor 23 detects the preceding black laser beam, the respective color registration measuring images are written by means of the yellow-use laser beam, magenta-use laser beam, or cyan-use laser beam (S30). Note that emission of the preceding black laser beam is stopped at the moment when the laser beam is detected at the first main-scanning beam detecting unit 23a of the horizontal synchronization sensor 23. In addition, for example, the same pattern as the pattern RB1 shown In FIG. 12 is written as the registration measuring images for the respective colors.

Thereafter, the difference in read time between the two registration sensors 78 and 80 is obtained; on the basis of this time difference, the deviation magnification and the lateral displacement amount in the main-scanning direction of the yellow-use laser beam, magenta-use laser beam, and cyan-use laser beam are calculated; the image clock corresponding to the deviation magnification is obtained; and the above-mentioned set margins $\Delta TY0$, $\Delta TM0$, and $\Delta TC0$ are updated to the time corresponding to the lateral displacement amount in the main-scanning direction (S31).

Then, the CPU causes the yellow, magenta, cyan image clock generating units 119Y, 119M, 119C to set a new image clock frequency (S32), and also causes the delay time data holding unit of each of the yellow, magenta, cyan data control units 115Y, 115M, 115C to hold the updated set margins $\Delta TY0$, $\Delta TM0$, $\Delta TC0$ (S33).

As described above, yellow, magenta, cyan registration measuring images are also written in with reference to the moment when the first main-scanning beam position detecting unit 23a detects the preceding black beam.

Figure 15:
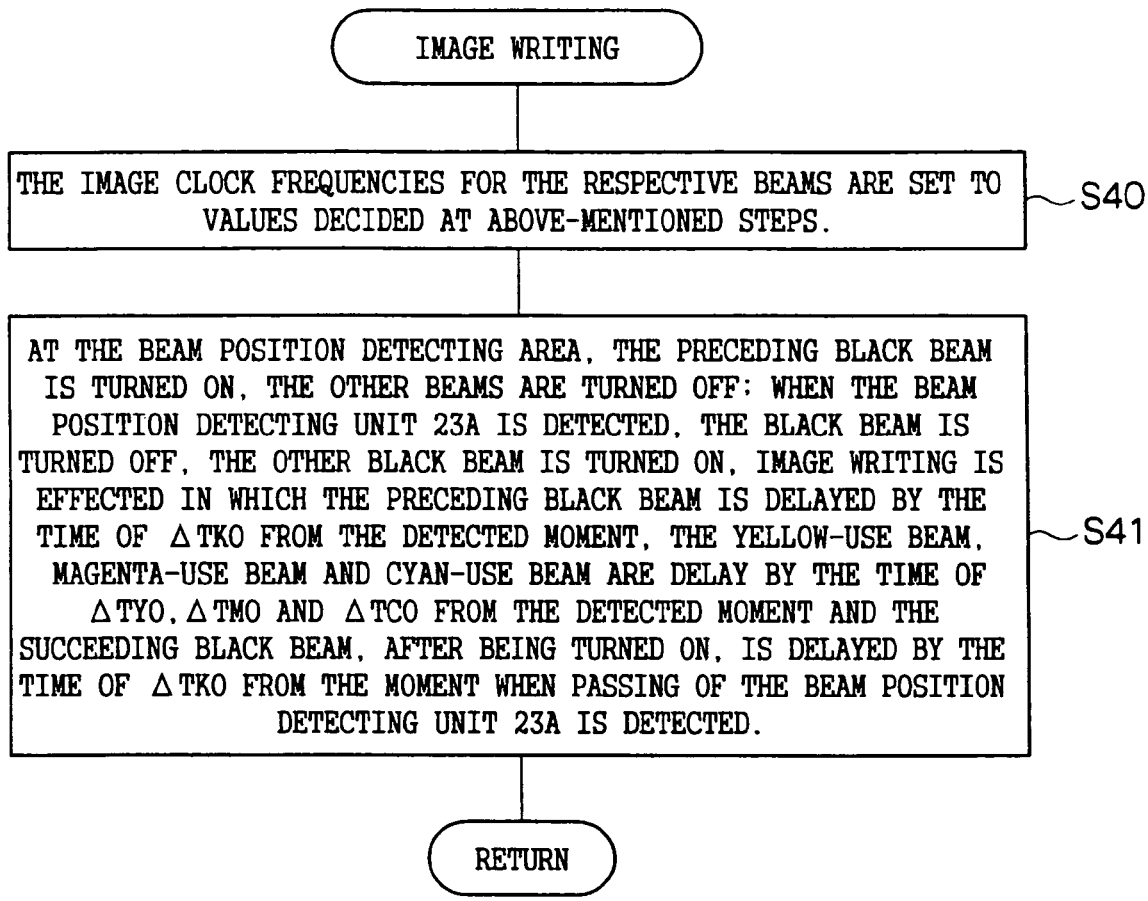
FIG. 15 is a flowchart showing timing control processing in the main-scanning direction at the time of image writing shown in FIG. 8.

After processing of the above-mentioned the registration correction mode (S1 to S3 in FIG. 8) is executed, the processing (image writing) in the image forming mode is executed wherein the timing control as shown in FIG. 15 is executed.

The black-use or color-use image clock frequency is set to the value which is determined in the above-mentioned registration correction mode (s40).

In the beam position detecting area, the preceding black laser beam is emitted; emissions of the other laser beams are stopped; at the moment when the preceding black laser beam is detected by the first main-scanning beam position detecting unit 23a in the horizontal synchronization sensor 23, the emission of the preceding black laser beam is stopped; and the succeeding black laser beam is emitted; the preceding black beam, yellow-use laser beam, magenta-use laser beam, and cyan-use laser beam, respectively, write images at the moment when the set margin $\Delta$TK0, $\Delta$TY0, $\Delta$TM0 or $\Delta$TC0 elapses from the detecting moment; and the succeeding black laser beam writes an image at a moment when the set margin $\Delta$Tk0 elapses from the moment when the succeeding black laser beam is detected at the first main-scanning beam position detecting unit 23a (S41).

As described above, in the first embodiment, with respect to the color-use laser beams, writing of images are executed with reference to the horizontal synchronization timing of the preceding black laser beam. Further, with respect to the preceding black laser beam and succeeding black laser beam, writing of images are executed with reference to their own horizontal synchronization timing.

The optical beam scanning device and the image forming apparatus according to the first embodiment exhibits the succeeding advantages.

According to the first embodiment, since the configuration is adapted in which only the black-use laser beam is caused to reach the horizontal synchronization sensor, when the same post-deflection optical system is used, the image effective angle (area) can be made larger than prior arts. Alternatively, a deflecting angle whose performance must be substantially secured in order to secure the same image effective angle (area) can be made smaller than the prior arts, and as a result, dimension of the optical elements for image formation and the polyhedral mirror body (rotational polyhedral mirror) can be reduced.

Figure 16:
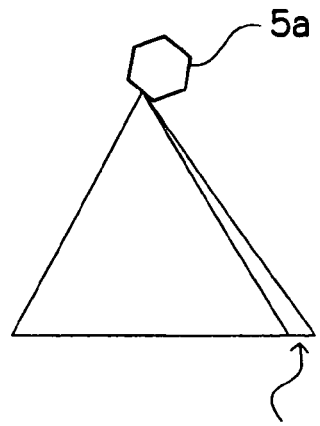
FIG. 16 is a view illustrating advantageous effects related to the deflection according to the first embodiment.

Moreover, according to the first embodiment, as shown in FIG. 16, as for the area other than imaging area in the main-scanning direction, the area that guides the black-use laser beam to the horizontal synchronization sensor is merely needed, and the deflecting angle of the polyhedral mirror body of the light deflecting unit can be made smaller.

Alternatively, when the deflecting angle is made to the value equal to the angle of the prior arts, the angle to be used for the original image formation can be made larger.

When the deflecting angle is made smaller, the area required for securing the performance as the image formation optical elements also can be made smaller, so that securing of imaging characteristic and so on as a whole can be made easier, and the dimensions of the optical elements for image forming and the polyhedral mirror body can be also made smaller.

As is shown in the first embodiment, substantially any problem does not arise even though only the black-use laser beam is guided to the horizontal synchronization sensor; and with respect to the other color components, even though the image forming is performed with reference to the moment when the horizontal synchronization sensor detects the black-use laser beam.

Specifically, a human sensitivity test has revealed that, in a case where an image is formed by means of a plurality of laser beams (corresponding to the case where a black image is formed by means of two black-use laser beams in the first embodiment), when the relative position between the laser beams is larger than 10 µm, the jaggy portion of the straight line in the sub-scanning direction can be perceived by human eyes. In contrast, the human sensitivity test has revealed that, in a case where a color image is formed by superposing images of different color components, when the displacement amount in the images by respective color components is larger than 85 µm, the color displacement exceeds the allowable range for color displacement.

For this reason, it is necessary that the pitch displacement between the plurality of laser beams which form one latent image (black image) is reduced to 10 µm or smaller, and the position displacement between the beams which form different latent images is reduced to 85 µm or smaller.

According to the first embodiment, each of the two black-use laser beams which form the same image is detected by a horizontal synchronization sensor, and image forming is executed with reference to the moment when the laser beam is detected, the inter-beam pitch displacement can be reduced to a value of 10 µm or smaller. On the other hand, with respect to the other color components, image forming is executed with reference to the moment when the horizontal synchronization sensor detects the black-use laser beam. Since position displacement between the black-use laser beam and the laser beams of the other color components is allowed up to the value of 85 µm, this precision can be easily achieved.

In actual, when a plurality of beams are deflected by means of one deflecting surface (or an integrally processed deflecting surface) (if the degree of flatness of the deflecting surface is sufficient), the relative positions of a plurality of beams do not change with respect to each surface, whereby allowable inter-beam pitch can be realized by means of the above-mentioned image writing processing.

However, when there is a possibility in which the order of incidence to the sensor by the black-use beam is frequently varies (such things may happen under influences of thermal deformation of LD or finite lens.) such configuration may be available in which judgment of the order of incidence by the black multi-beams in the processing Si is executed with respect to each timing between papers, whereby the preceding beam is re-defined with respect to each between-paper.

Note that, in the processing of the registration correction mode, the polyhedral mirror body is rotated by one-time rotation, whereby the registration correction information being held may be obtained by averaging the registration correction information with respect to each deflecting surface or the like.

A configuration may be adopted in which, with respect to the light beam for writing the latent image of one color component using a plurality of beams, the timing of every laser beam is not measured outside the imaging area in the main-scanning direction but is measured outside the imaging area in the sub-scanning direction, whereby the timing is held. (Refer to the second embodiment that is described later.)

According to the first embodiment, since adjustment processing of magnification and position in the main-scanning direction of a black beam is performed prior to the adjustment processing of magnification and position in the main-scanning direction of color-use beam, the adjustment processing of magnification and position in the main-scanning direction of color beam can be performed appropriately with reference thereto.

With respect to the black-use laser beam that serves as reference, if it is known that there exists magnification deviation and position displacement or the like, such deviation and displacement needs to be corrected at the time when registration data is acquired. If the adjustment of magnification and position in the main-scanning direction of the color-use beam is executed prior to the adjustment of magnification and position in the main-scanning direction of the black multi-beams, it may happen that the magnification of the color-use beam, the magnification of the black multi-beams emitted at the time of adjustment of position in the main-scanning direction, and/or positions in the main-scanning direction may not be appropriate; and eventually the adjustment of magnification and position in the main-scanning direction of the color-use beam are executed inappropriate.

Although FIG. 8 shows the processing from the viewpoint of the adjustment of magnification and position in the main-scanning direction, if the procedure including the other adjustment is described, the succeeding procedure is preferred. Specifically, it is preferred that, with respect to a bundle of the light beams including reference beam, magnification correction, main/sub-scanning directional position displacement correction, scanning line inclination correction is performed; thereafter, magnification correction, main/sub-scanning directional position displacement correction and scanning line directional inclination correction of the other beams are performed.

Further, the two black-use laser beams are controlled by common image clock frequency, so that, also in this respect, inter-beam pitch displacement can be reduced to 10 μm or smaller.

Further, according to the first embodiment, as the horizontal synchronization sensor, a horizontal synchronization sensor having the two main-scanning beam position detecting units 23a and 23b distanced by a predetermined distance in the main-scanning direction is used; as the black-use registration measuring image, an image which moves N dots in the sub-scanning direction when it moves M dots in the main-scanning direction is used; two images are written one of which references a point of time that is detected by one main-scanning beam position detecting unit 23a while the other of which references the other point of time that is detected by the other main-scanning beam position detecting unit 23b; based on the data obtained by the registration sensors 78 and 80 that read the registration measuring image, magnification deviation in the main-scanning direction is obtained with the above-described calculation. Owing to this configuration, even though the precision of the installation positions of the registration sensors 78 and 80 is low, magnification deviation in the main-scanning direction can be detected at a high precision.

With respect to the main-scanning direction of the exposure onto the photosensitive drum by the post-deflection optical system; i) temperature change causes deviation in wavelength of laser beam and this further causes magnification deviation in the main-scanning direction, ii) thermal expansion of optical elements, housing, positioning elements in the apparatus and so forth cause magnification deviation in the main-scanning direction; iii) replacement of photosensitive drum or the like causes the pitch between optical element and drum to vary, so that the magnification in the main-scanning direction is deviated. The magnification deviation in the main-scanning direction occurs at almost the same ratio in all the area with reference to the position of a horizontal synchronization sensor.

According to the conventional method in which, by means of the outputs of two registration sensors, magnification in the main-scanning direction is measured and corrected by the image clock frequency, when the distance between registration sensors is displaced at an early stage, or from the middle, displaces at an early stage, or displaced from the middle, the main-scanning direction magnification to be measured does not become accurate; so that it cannot be distinguished between the state in which an actual displacement caused by the factors i) to iii) occurs and a state in which a registration sensor position is displaced.

On the other hand, according to the first embodiment, regardless of the problem pertaining to the precision and attaching positions of the registration sensors, the magnification deviation in the main-scanning direction can be detected, therefore the magnification deviation in the main-scanning direction caused by the factors i) to iii) can be detected and compensated appropriately.

(A Second embodiment)

Next referring to the drawings, the second embodiment of the optical beam scanning device and the image forming apparatus according to the present invention is described by focusing on the difference thereof from the first embodiment.

The second embodiment is the same as the first embodiment in the entire configuration (See FIG. 1) of the transfer-type color image forming apparatus, the configuration of the optical beam scanning device (See FIGS. 2 and 3), the detailed configuration of the horizontal synchronization sensor (See FIG. 4), the internal configuration of the registration sensor (See FIG. 6) and the processing circuit (See FIG. 7) which controls the image forming operation.

The second embodiment is different from the first embodiment in the processing in the registration correction mode and contents of timing setting processing in the image forming mode. Note that, although, in the first embodiment, writing-out timing of every black multi-beam is always determined based on the signal of the horizontal synchronization sensor while, in the second embodiment, relative timing of the black multi-beams is measured outside the imaging area, the only moment when the most preceding beam among black multi-beams enters the horizontal synchronization sensor is detected during image forming, and with respect to the other beams, the operation timing is determined based on the relative timing when the other beams are measured outside the imaging area and the moment when the most preceding beam among black multi-beams enters the horizontal synchronization sensor.

Figure 17:
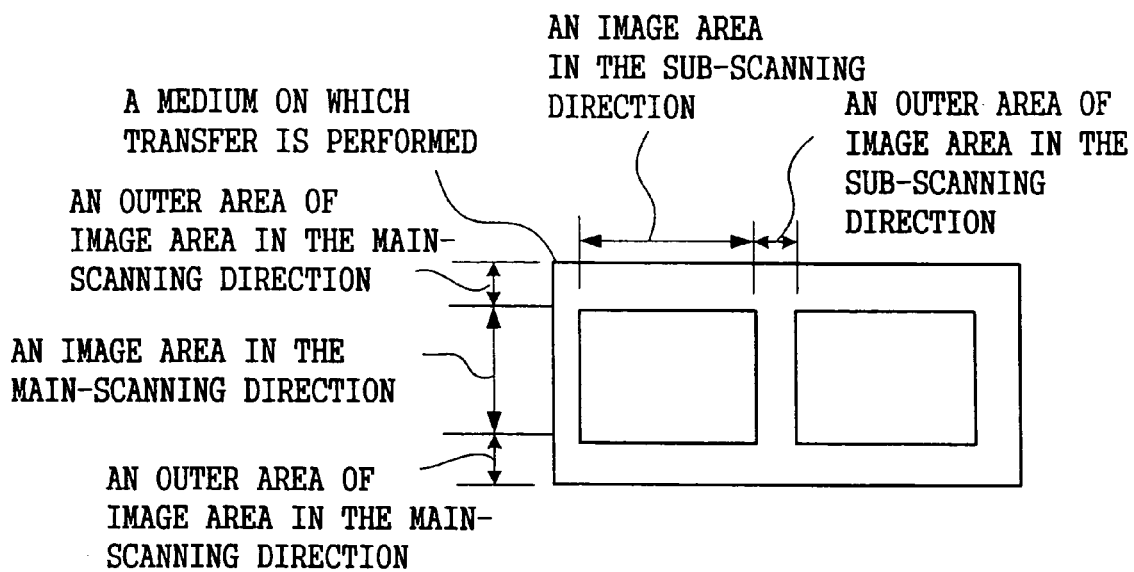
FIG. 17 is a view illustrating timing when the processing of registration correction mode is executed in a second embodiment.

FIG. 17 is a drawing that describes the timing in which processing in the registration correction mode in the second embodiment is executed.

Supposing that surface of the photosensitive drum, which is a medium on which transfer is effected (surface to be scanned), is a plane having a unlimited length, as shown in the schematic drawing of FIG. 17, there are areas outside the imaging areas in the main-scanning direction and sub-scanning direction. In the second embodiment, processing in the registration correction mode is executed at the timing (period) in an area outside the imaging area in the sub-scanning direction. Correction between respective colors is executed at a predetermined timing and only the correction in which a plurality of beams are used to form the latent image may be executed between papers. The areas outside the imaging areas in the sub-scanning direction are an area corresponding to a time period immediately after the power is activated and an area corresponding to a time spent between papers or the like.

Figure 18:
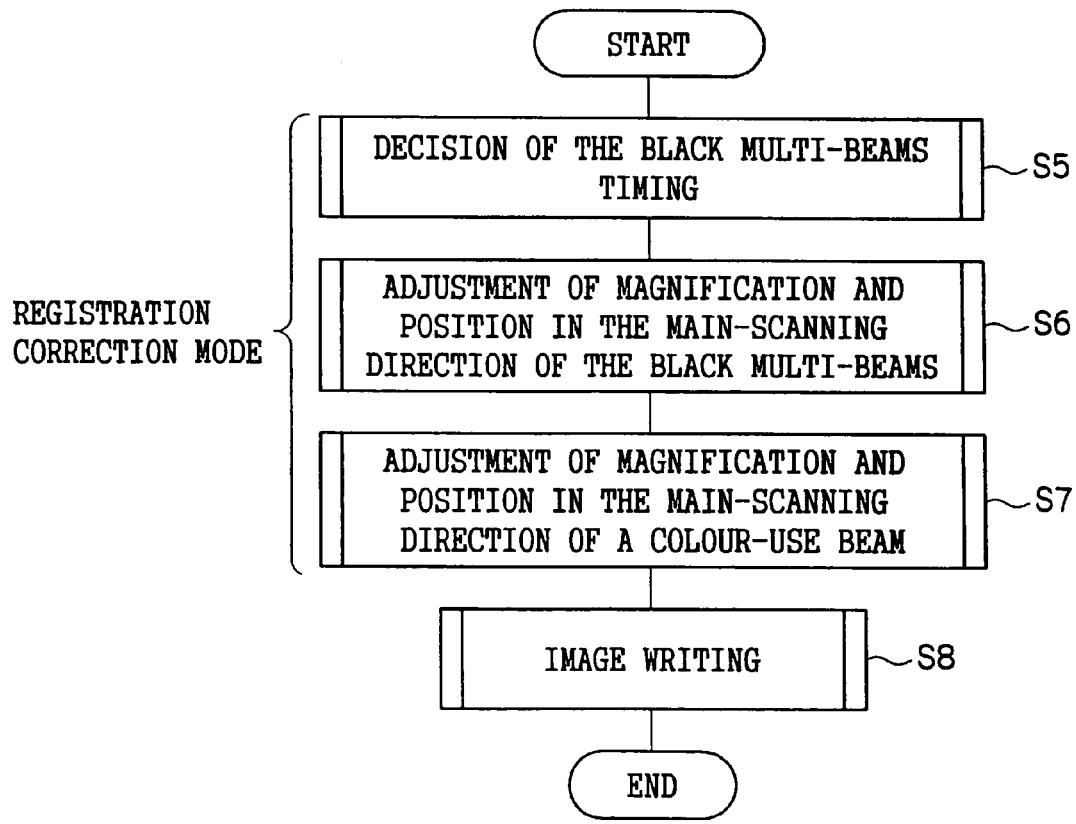
FIG. 18 is a flowchart showing the sequence of timing control operation in the image forming apparatus according to the second embodiment.

FIG. 18 is a flowchart which shows the sequence of the processing executed in the area outside the imaging area in the sub-scanning direction and the sequence of the processing in image forming mode executed in the imaging area in the sub-scanning direction.

After processing in the registration correction mode (S5 to S7) is executed, the sequence of processing shifts to the processing in the image forming mode (S8). Such processing may be repeated in the second embodiment. Alternatively, only one-time processing in the registration correction mode may be performed at one-time transfer activation. Further, such a configuration may be employed in which, when a continuous transfer is activated, the processing in the registration correction mode is performed, thereafter a predetermined number of times of transfer is executed, and thereafter the processing in the next registration correction mode is executed, so that only the timing deciding processing of black multi-beams (s5) can be executed between the writing of each image (between-paper).

In the case of the second embodiment, the timing deciding processing of black multi-beams is executed instead of the deciding processing of the order of incidence of the black-multi-beams (S1) in the first embodiment.

A sub-flow chart in the second embodiment requires detailed description because it is different from the first embodiment.

Figure 19:
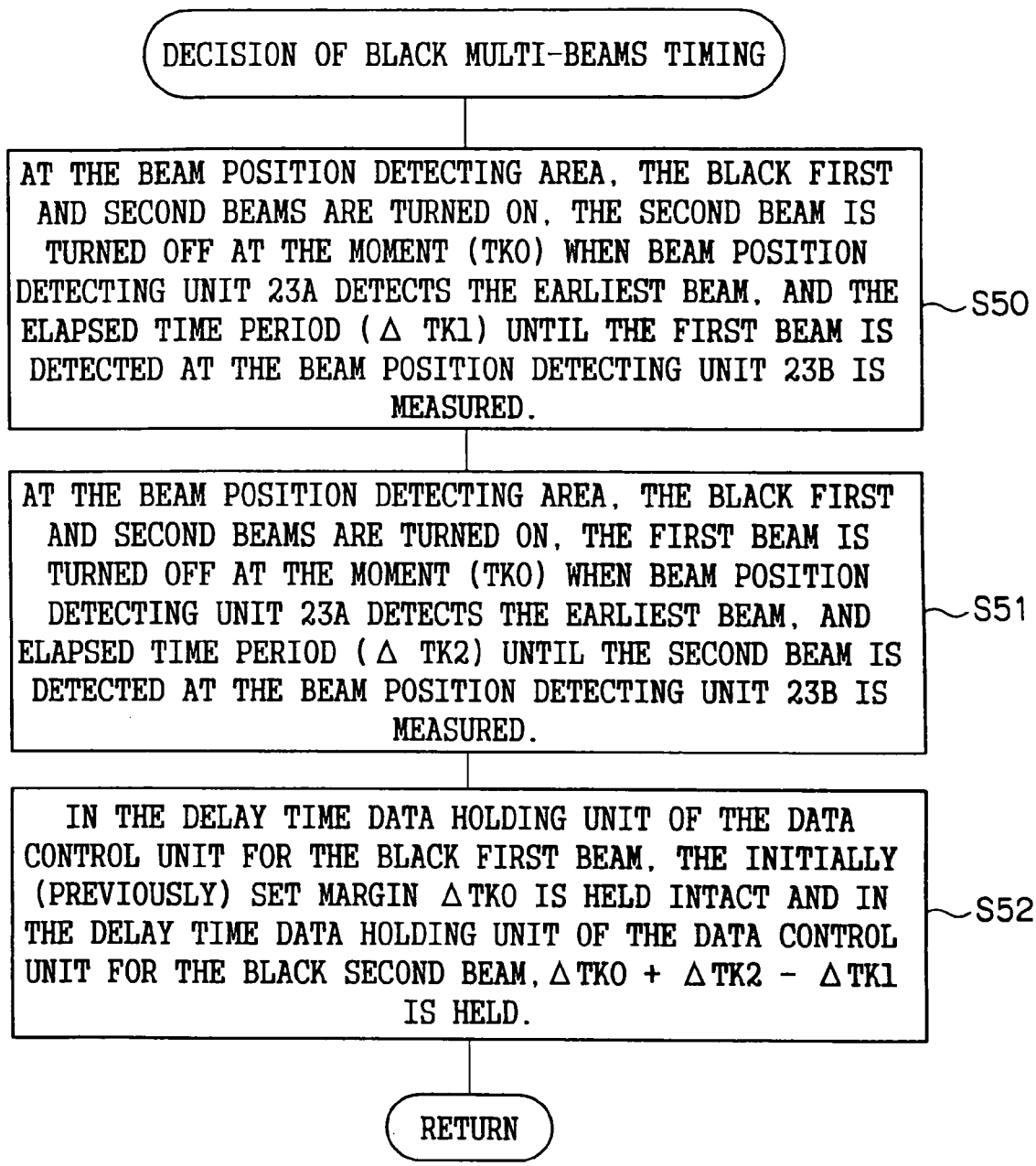
FIG. 19 is a flowchart showing details of the timing deciding processing of the black multi-beam in FIG. 18.

FIG. 19 shows details of the timing deciding processing of the black multi-beams (S5). Note that, at this timing deciding processing of the black multi-beams, emissions of the laser beams of the other color components are not executed.

First, at the beam position detecting area, black-use first and second laser beams are emitted; at the moment Tk0 when the first main-scanning beam position detecting unit 23a detects either laser beam (regardless of whether the detected laser beam is the first laser beam or second laser beam), emission of the second laser beam is stopped; and time $\Delta Tk1$ is measured (S50), the time $\Delta Tk1$ being time taken from the moment Tk0 to the moment when the first laser beam is detected at the second main-scanning beam position detecting unit 23b in the horizontal synchronization sensor 23.

Further, in the beam position detecting area, the black-use first and second laser beam are emitted; at the moment Tk0 when the first main-scanning beam position detecting unit 23a detects either laser beam (regardless of whether the detected laser beam is the first laser beam or second laser beam) emission of the first laser beam is stopped; and time $\Delta Tk2$ is measured (S51), the time $\Delta Tk2$ being time taken from the moment Tk0 to the moment when the second laser beam is detected at the second main-scanning beam position detecting unit 23b in the horizontal synchronization sensor 23.

Thereafter, an initially (or previously) set margin $\Delta Tk0$ in the delay time data holding unit of the data control unit 115B1 associated with the black-use first laser beam is kept intact and a set margin $\Delta Tk0+\Delta Tk2-\Delta Tk1$ determined by the time thus measured are held in the delay time data holding unit of the data control unit 115B2 associated with black-use second laser beam (S52).

Note that the time $\Delta Tk2-\Delta Tk1$ in the set margin $\Delta Tk0+\Delta Tk2-\Delta Tk1$ associated with the black-use second laser beam is determined to a time difference (inter-beam pitch) between black-use first and second laser beams in the main-scanning direction, while the set margin associated with the black-use second laser beam is determined to a value obtained by correcting the initially (or previously) set margin $\Delta Tk0$ by this time difference.

Also, unlike the first embodiment, in the case of the second embodiment, a configuration is employed in which, when both of the black-use first and second laser beams are turned on, it is not identified which of the first beam or second laser beam reaches the first main-scanning beam position detecting unit 23a of the horizontal synchronization sensor 23 earlier but the laser beam, which reaches earlier, serves as a reference beam of the timing in the main-scanning direction.

Figure 20:
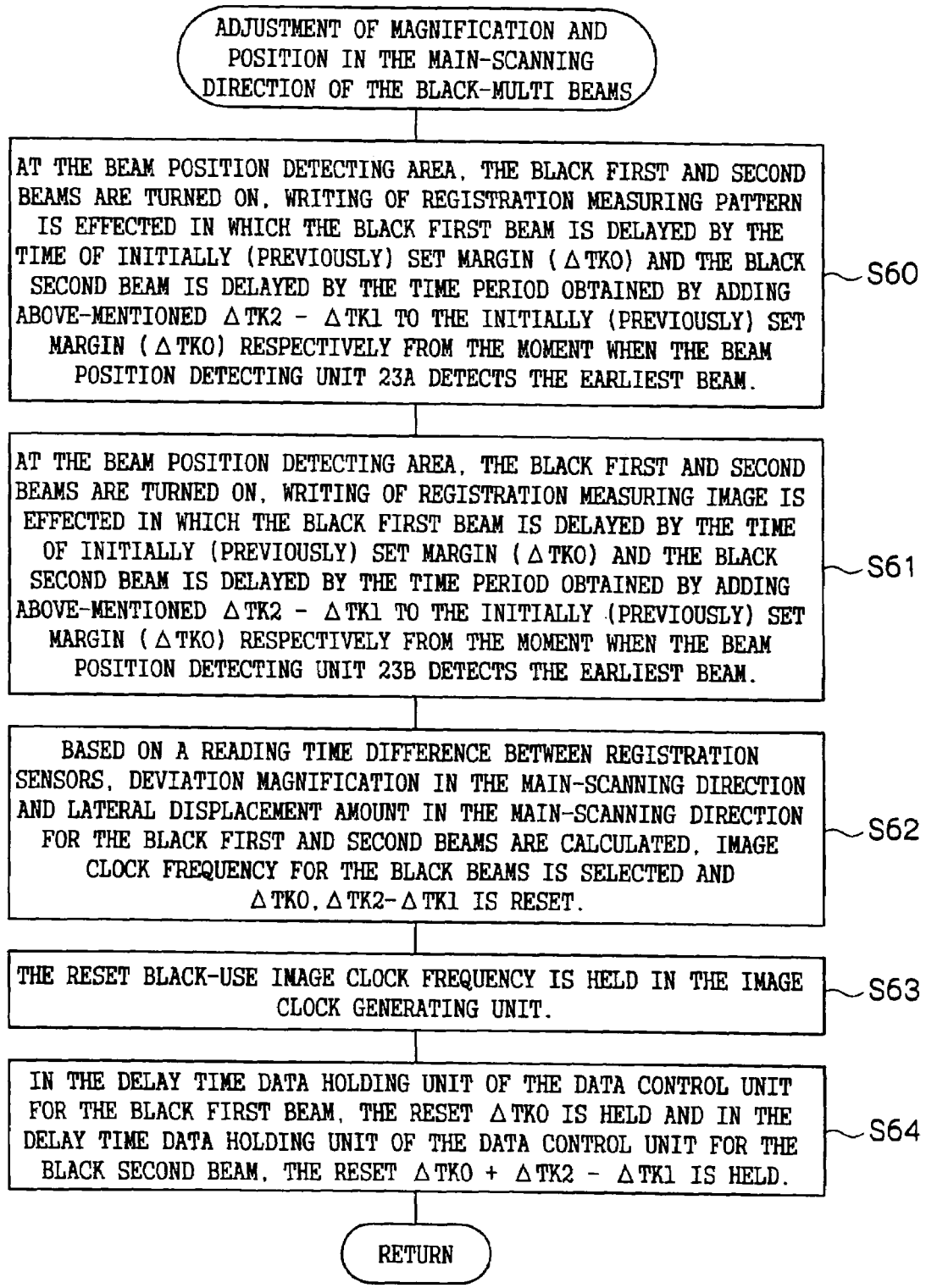
FIG. 20 is a flowchart showing details of adjustment processing of magnification and position in the main-scanning of the black multi-beams in FIG. 18.

FIG. 20 shows details of the adjustment processing of magnification and position in the main-scanning direction of the black multi-beams according to the second embodiment. The reason why the adjustment processing of the magnification and the position in the main-scanning direction of black multi-beams is executed prior to the adjustment processing of the magnification and the position in the main-scanning direction of color-use beams is the same reason as is explained in the first embodiment.

First, in the beam position detecting area, black-use first and second laser beams are emitted; with respect to the black-use first laser beam, the writing of registration measuring image is effected from a moment when the initially (or previously) set margin $\Delta TK0$ elapses from a moment when the first main-scanning beam position detecting unit 23a of the horizontal synchronization sensor 23 detects either beam (regardless of whether the detected laser beam is the black-use first laser beam or the black second laser beam); and with respect to the black-use second laser beam, writing of a registration measuring image is effected from a moment when the set margin $\Delta Tk0+\Delta Tk2-\Delta Tk1$ elapses (S60).

Also, in the beam position detecting area, black-use first and second laser beams are emitted; with respect to the black-use first laser beam, the writing of the registration measuring image is effected from the moment when the initially (or previously) set margin $\Delta TK0$ elapses from a moment when the second main-scanning beam position detecting unit 23b of the horizontal synchronization sensor 23 detects either laser beam (regardless of whether the detected laser beam is the black-use first laser beam or the black second laser beam); and with respect to the black-use second laser beam, writing of a registration measuring image is effected from the moment when the set margin $\Delta Tk0+\Delta Tk2-\Delta Tk1$ elapses from a moment when the second main-scanning beam position detecting unit 23b of the horizontal synchronization sensor 23 detects either laser beam (S61).

By means of the above-mentioned processing; also with respect to the black-use first and second laser beam, two registration measuring images are written at each of the upstream and downstream with reference to the first and second main-scanning beam position detecting units 23a and 23b in the horizontal synchronization sensor 23. Among these four registration measuring images, two images to which the first main-scanning beam position detecting unit 23a is referenced and the other two images to which the second main-scanning beam position detecting unit 23b is referenced are written in such a manner as to be distanced away from each other in the sub-scanning direction (See FIG. 12). Also, patterns are those as shown in FIG. 12.

Thereafter, a read time difference at the registration sensors 78 and 80 is obtained; on the basis of this time difference, deviation magnification in the main-scanning direction and lateral displacement in the main-scanning direction of the black-use first and second laser beams are calculated; the image clock frequency corresponding to the deviation magnification is obtained; the above-mentioned set margin ΔTK0 is updated to time corresponding to the lateral displacement amount in the main-scanning direction; and data corresponding to the time difference ΔTK2−ΔTK1 in the main scanning direction of the black-use first and second laser beams (for example, number of clocks and transfer data) is also updated (S62).

Then, the image clock generating unit 119B for the black element is caused to set a new image clock frequency (S63); also the delay time data holding units in the black-element data control units 115B1 and 115B2 are caused to hold data corresponding to the updated set margins ΔTK0 and ΔTK0+ΔTK2−ΔTK1 (S64).

FIG. 21 shows details of the adjustment processing of the magnification and position in the main-scanning direction of color-use beam in FIG. 18.

First, in the beam position detecting area, the black-use first and second laser beams are emitted, and emissions of the other color component laser beams are stopped; the respective color registration measuring images are written by means of the yellow-use laser beam, magenta-use laser beam, or cyan-use laser beam respectively (S70) at a moment when the previously (or initially) set margin ΔTY0, ΔTM0 or ΔTC0 elapses from the moment when the first main-scanning beam position detecting unit 23a of the horizontal synchronization sensor 23 detects the black-use laser beam (regardless of whether detected laser beam is the black-use first laser beam or the black-use second laser beam). Note that emissions of black-use first and second laser beams are stopped at the moment when detection is effected at the first main-scanning beam detecting unit 23a of the horizontal synchronization sensor 23. Also, as the respective color registration measuring images, for example, the same pattern as the pattern RB1 shown in FIG. 12 is written.

Thereafter, a read time difference between the two registration sensors 78 and 80 is obtained; on the basis of this time difference, deviation magnification in the main-scanning direction and lateral displacement in the main-scanning direction of the yellow-use laser beam, magenta-use laser beam, and cyan-use laser beam are calculated; the image clock frequency corresponding to the deviation magnification is obtained, and the above-mentioned set margins ΔTY0, ΔTM0 and ΔTC0 are updated to the time correspond to the lateral displacement amount in the main-scanning direction (S71).

Then, the yellow-use, magenta-use and cyan-use image clock generating units 119Y 119M, 119C, are caused to set a new image clock frequency (S72); and also the delay time data holding units of the yellow-use magenta-use and cyan-use data control units 115Y, 115M and 115C are caused to hold the updated set margins ΔTY0, ΔTM0 and ΔTC0, respectively (S73).

After completing the processing of the above-mentioned registration correction mode (S5 to S7 in FIG. 18) the sequence shifts to the processing of the image forming mode (image writing) in which the timing control as shown in FIG. 22 is executed. The processing in the image forming mode is executed in the imaging area in the sub-scanning direction.

The black-use or color-use image clock frequencies are set to the values determined in the above-mentioned registration collection mode (S80).

In the beam position detecting area, the black first and second laser beams are emitted, and emissions of the laser beams of the other color component are stopped; emissions of the black-use first and second laser beams are stopped at the moment when the first main-scanning beam detecting unit 23a of the horizon synchronization sensor 23 detects either laser beam (regardless of whether the detected laser beam is the black-use first laser beam or the black-use second laser beam); and each of the black-use first laser beam, the black-use second laser beam, yellow-use laser beam, magenta-use laser beam, and cyan-use laser beam, writes an image at a moment when the set margin. ΔTK0, ΔTK0+ΔTK2−ΔTK1, ΔTY0, ΔTM0 or ΔTC0 elapses from the detected moment, respectively (S81).

As described above, in the second embodiment, with respect to all the laser beams, writing of the images is executed with reference to the horizontal synchronization timing of the preceding laser beam of the black first and second laser beams.

Also in the optical beam scanning device and image forming apparatus of the second embodiment, specifically, if the same post-deflection optical system is used, the image effective angle (area) can be made broader than prior art apparatus. Alternatively, the deflecting angle whose performance must be substantially secured in order to secure the same image effective angle (area) can be made smaller than prior art apparatus, and further the dimensions of optical elements for image forming and the polyhedral mirror body (rotational polygon mirror) can be reduced.

Alternatively, only black-use laser beam is guided to the horizontal synchronization sensor, and with respect to the other color components, image formation is effected with reference to the moment when the horizontal synchronization sensor detects the black-use laser beam, sufficient image quality can be actually realized.

Further, even where precision of the installation position of the registration sensors 78 and 80 is low, the magnification deviation in the main-scanning direction can be detected at a high precision, and the magnification deviation can be compensated in an appropriate manner.

Since the processing in the registration correction mode is executed at an area outside the imaging area in the sub-scanning direction, detection and processing of yellow-use, magenta-use and cyan-use horizontal synchronization signals do not need to be executed during the image forming, so that the imaging area in the main-scanning direction can be made relatively broader when compared with prior art. Further, even though only black-use laser beam is guided to the horizontal synchronization sensor in order to execute the timing deciding processing for the black multi-beams, the processing can be executed with sufficient time by executing the processing during the time period other than the image forming. Thereby, when the timing for the black multi-beams is decided, such processing may be used in which an average of the one-time rotation of a deflector that is apt to occur periodical variations can be taken, or the like.

When a plurality of light beams are deflected at one deflecting surface (reflecting surface) of the polyhedral mirror body (rotational polygon mirror) or an integrally processed deflecting surface, the relative positions of the plurality of beams do not change with respect to each surface (if the deflecting surfaces exhibit sufficient flatness). Utilizing this feature, the second embodiment realizes the succeeding: only one laser beam serving as a reference is detected within the imaging area in the sub-scanning direction, whereas a relationship with the reference laser beam is obtained with respect to the other laser beam at the area outside the imaging area in the sub-scanning direction, and utilizing the data thereof, illumination timing is determined. Owing to this configuration, it becomes unnecessary that the timing of all the laser beams does not need to be measured at the area outside the imaging area in the main-scanning direction during the time period when scanning is being performed by means of one deflecting surface or the integrally processed deflecting surface. Instead, a configuration is realized in which timing with respect to each laser beam is sequentially measured at substantially the same place in the main-scanning direction during the period when scanning is being performed by the plurality of deflecting surfaces at the area outside the imaging area in the sub-scanning direction, and values for the respective laser beams for correcting the timing are held.

(Third embodiment)

Next, with reference to the drawings, a third embodiment of the optical beam scanning device and image forming apparatus according to the present invention will be described.

A feature of the third embodiment that is greatly different from that of the first embodiment is that the number of black-use laser beams is four, the number of each of yellow-use, magenta-use and cyan-use laser beams is two. That is, in the third embodiment, since each latent image is scanned by a plurality of laser beams, in this configuration, the respective laser beams are caused to pass one horizontal synchronization sensor so that precision between beams to form one latent image is secured.

The image forming apparatus of the third embodiment also has the same configuration as that shown in FIG. 1, so that the explanation thereof is omitted.

Figure 23:
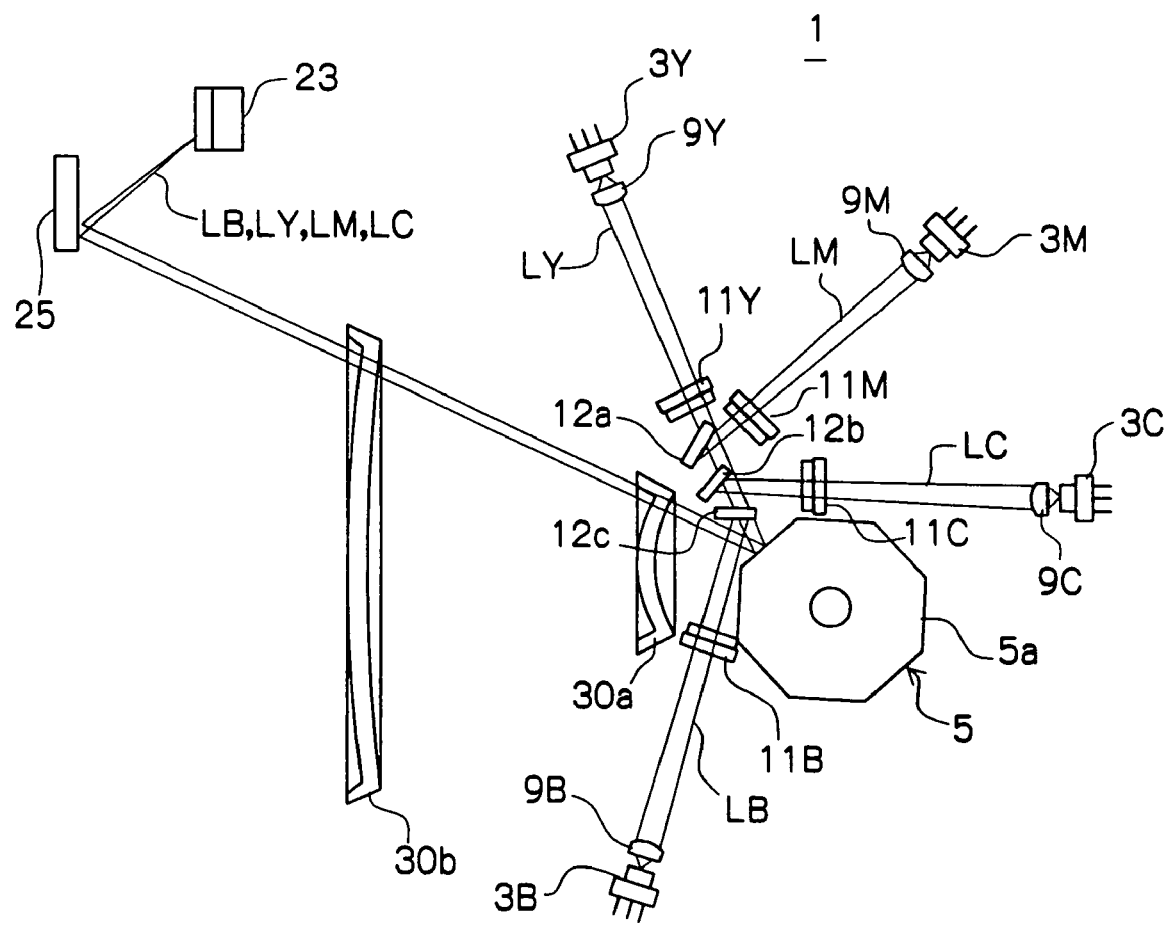
FIG. 23 is a schematic plan view showing a multi-beam optical beam scanning device according to a third embodiment.
Figure 24:
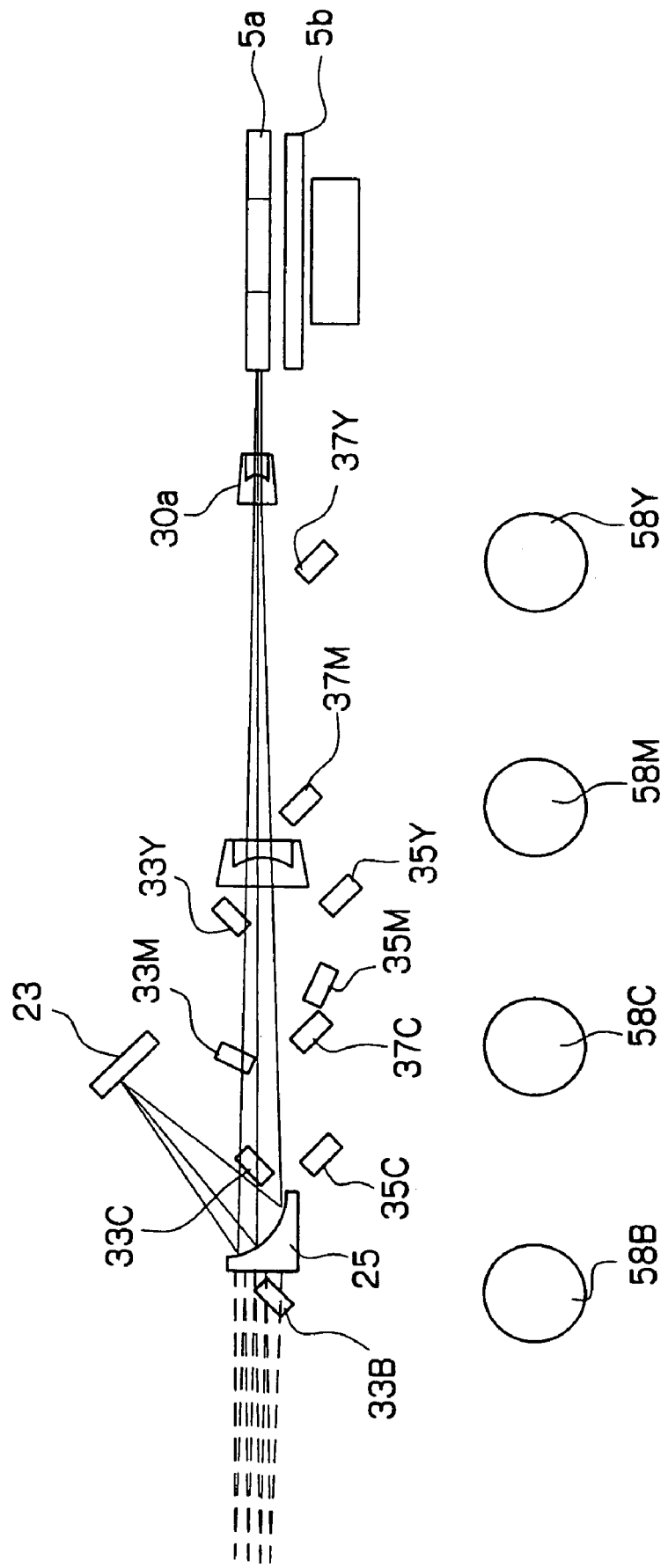
FIG. 24 is a schematic sectional view of the optical beam scanning device showing in FIG. 23, the view being obtained by cutting the optical beam scanning device at a position in which a deflection angle of a light deflection unit is zero degree.

FIGS. 23 and 24 correspond, respectively, to FIGS. 2 and 3 of the first embodiment and the same or corresponding elements or members are denoted by the same reference symbols as in the first embodiment to omit explanation.

The black-use, yellow-use, magenta-use, and cyan-use light sources 3 (B. Y. M. and C) are all constituted by a semiconductor array, wherein the black-use semiconductor laser array 3B has four illuminating points while each of the color-use semiconductor array 3Y, 3M, and 3C has two illuminating points.

In the case of the third embodiment, all the color component laser beams are incident on the horizontal synchronization deflection mirror 25, so that all the color component laser beams are reflected off to be incident on the horizontal synchronization sensor 23.

Figure 25:
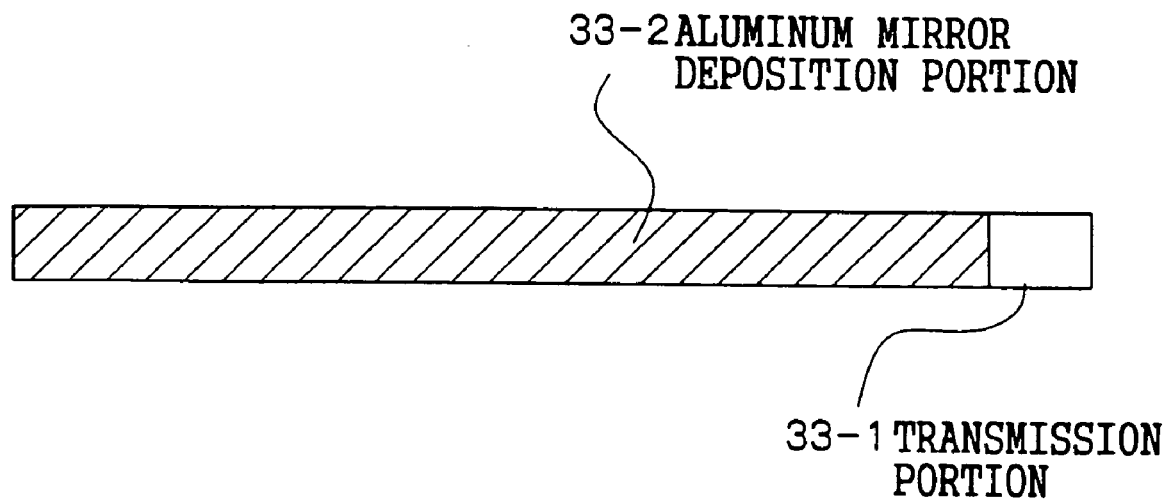
FIG. 25 is a schematic plan view showing first deflection mirrors 33Y, 33M, and 33C according to the third embodiment.
Figure 26:
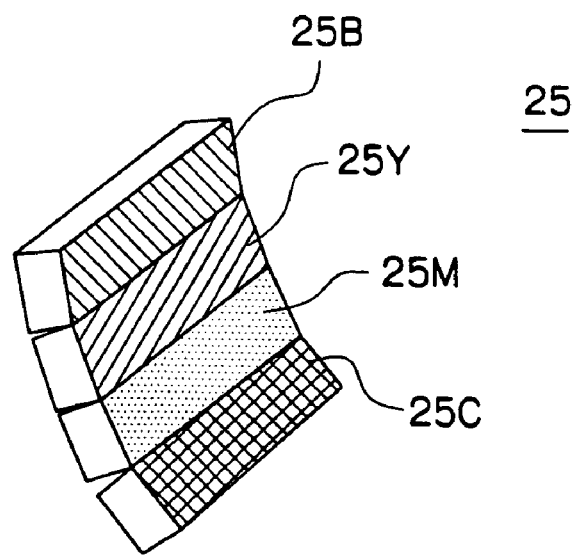
FIG. 26 is a schematic perspective view showing a deflection mirror 25 for horizontal synchronization according to the third embodiment.

To ensure this feature, each of the first deflection mirrors 33Y, 33M, and 33C is adapted to separate color-use laser beams passed the post-deflection optical system (the imaging optical system) 30 and is comprised of a transmission portion 33-1 whose upstream side in the main-scanning direction allows a laser beam to transmit and a reflection portion (aluminum mirror deposited portion) 33-2 which is formed the remaining portion thereon, as shown in FIG. 25. Each of the first deflection mirrors 33Y, 33M, and 33C shown in FIG. 25 can be prepared by masking the portion prepared for the transmission portion 33-1 with a tape or the like when the reflecting portion 33-2 of the first deflection mirrors 33Y, 33M, and 33C is formed by aluminum deposition.

The horizontal synchronization deflection mirror 25 is comprised of four plane mirrors 25B, 25Y, 25M, and 25C each corresponding to a color component. The four plane mirrors 25B, 25Y, 25M, and 25C have substantially the same reflecting angle in the main-scanning direction while having different reflecting angles in the sub-scanning direction. The reflecting angles in the sub-scanning direction are so set that the laser beams of the respective color components intersect at one point on a position equivalent to the image surface thereof. Namely, when the polyhedral mirror body 52*a* exhibits the same swinging angle, all the color component laser beams reach substantially the same position (corresponding to the above-mentioned intersecting point) on the horizontal synchronization sensor 23.

Figure 27:
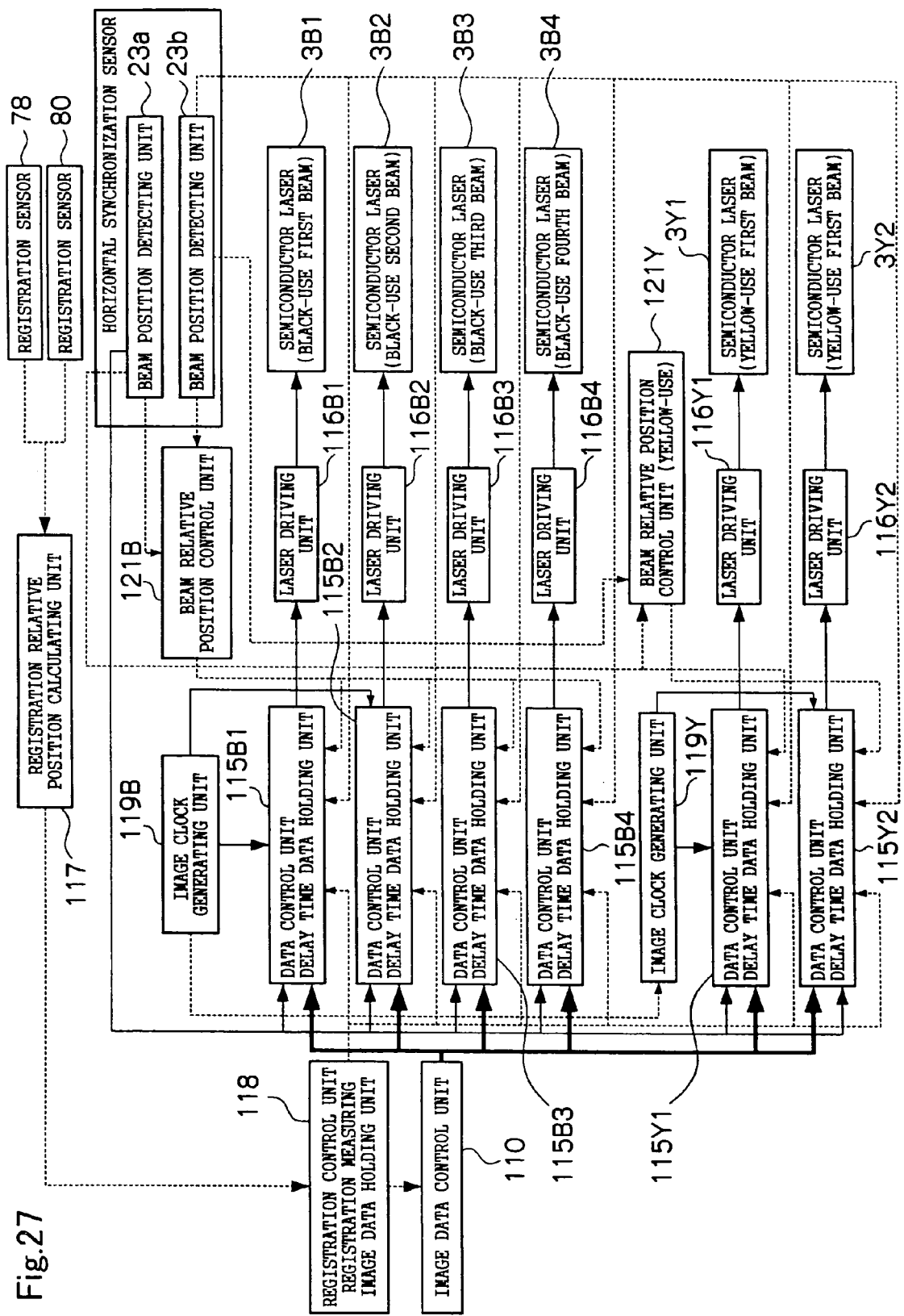
FIG. 27 is a schematic block diagram showing a processing circuit for controlling the image forming operation of the image forming apparatus according to the third embodiment.

FIG. 27 is a schematic block diagram of the processing circuit for controlling the image forming operations of the image forming apparatus according to the third embodiment and FIG. 27 corresponds to FIG. 7 of the first embodiment. Note that constituting elements for magenta and cyan have the same configuration as that of yellow, but they are omitted in FIG. 27 to avoid causing the drawing to be complicated.

For black-use, four series of members, i.e., data control units 115B1 to 115B4, laser driving units 116B1 to 116B4, semiconductor lasers 3B1 to 3B4 are provided; the image clock generating unit 119B is provided commonly for the four series; and the beam relative position control unit 121B is provided as well as the first embodiment.

For yellow-use, two series of members, i.e., data control units 115Y1 and 115Y2, laser driving units 116Y1 and 116Y2, and semiconductor lasers 3Y1 and 3Y2 are provided; the image clock generating unit 119Y is provided commonly for the two series; and a beam relative position control unit 121Y is provided.

The other constituting elements are the same as the processing circuit of the first embodiment (See FIG. 7).

Figure 28:
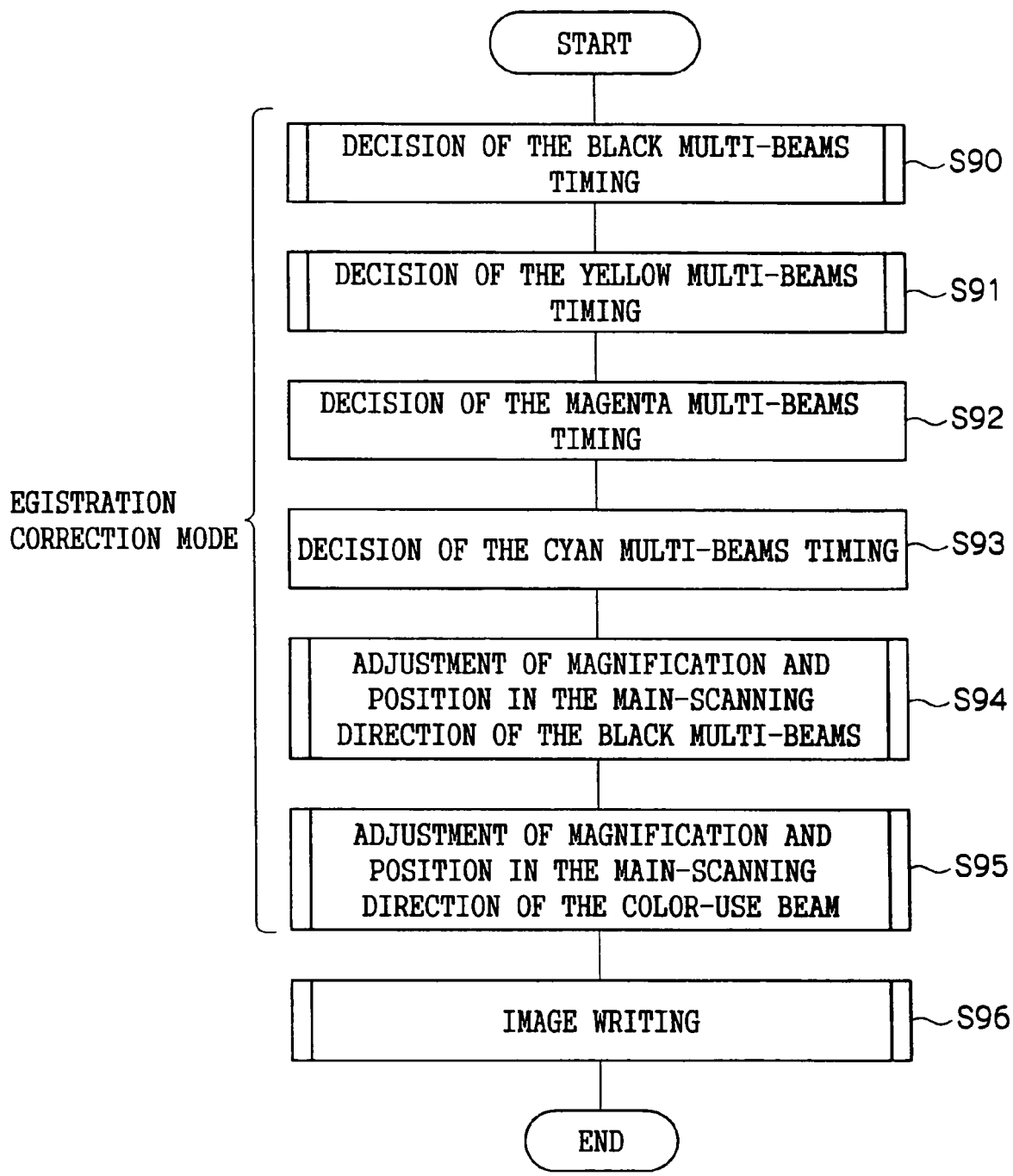
FIG. 28 is a flowchart showing the sequence of the timing control operation of the image forming apparatus according to the third embodiment.

FIG. 28 is a flowchart showing the sequence of the timing control processing executed in the registration correction mode and image forming mode.

FIG. 28 shows a sequence of: calculating a timing deviation amount for all the laser beams to form respective latent images of the black-use, yellow-use, magenta-use and cyan-use with respect to the each first laser beam; correcting absolute magnification (i.e., value setting at the image clock generating unit) and writing starting position in the black registration measuring image; correcting, with respect to other color components, an absolute magnification (i.e., value setting at the image clock generating unit) and writing starting position in accordance with a read value at the registration sensor so as to avoid generating of displacement from the black element; and adding the correction amount thus obtained to delay amount with respect to the laser beams which form the respective latent images.

The image forming apparatus of the third embodiment performs, in the registration correcting mode, timing deciding processing of the black multi-beams (S90), timing deciding processing of yellow multi-beams (S91), timing deciding processing of magenta multi-beams (S92), timing deciding processing of cyan multi-beams (S93), adjusting processing of the magnification and position in the main-scanning direction of black multi-beams (S94), adjusting processing of the magnification and position in the main-scanning direction of color multi-beams (S95); and thereafter, image writing processing in the image forming mode (S96).

Figure 29:
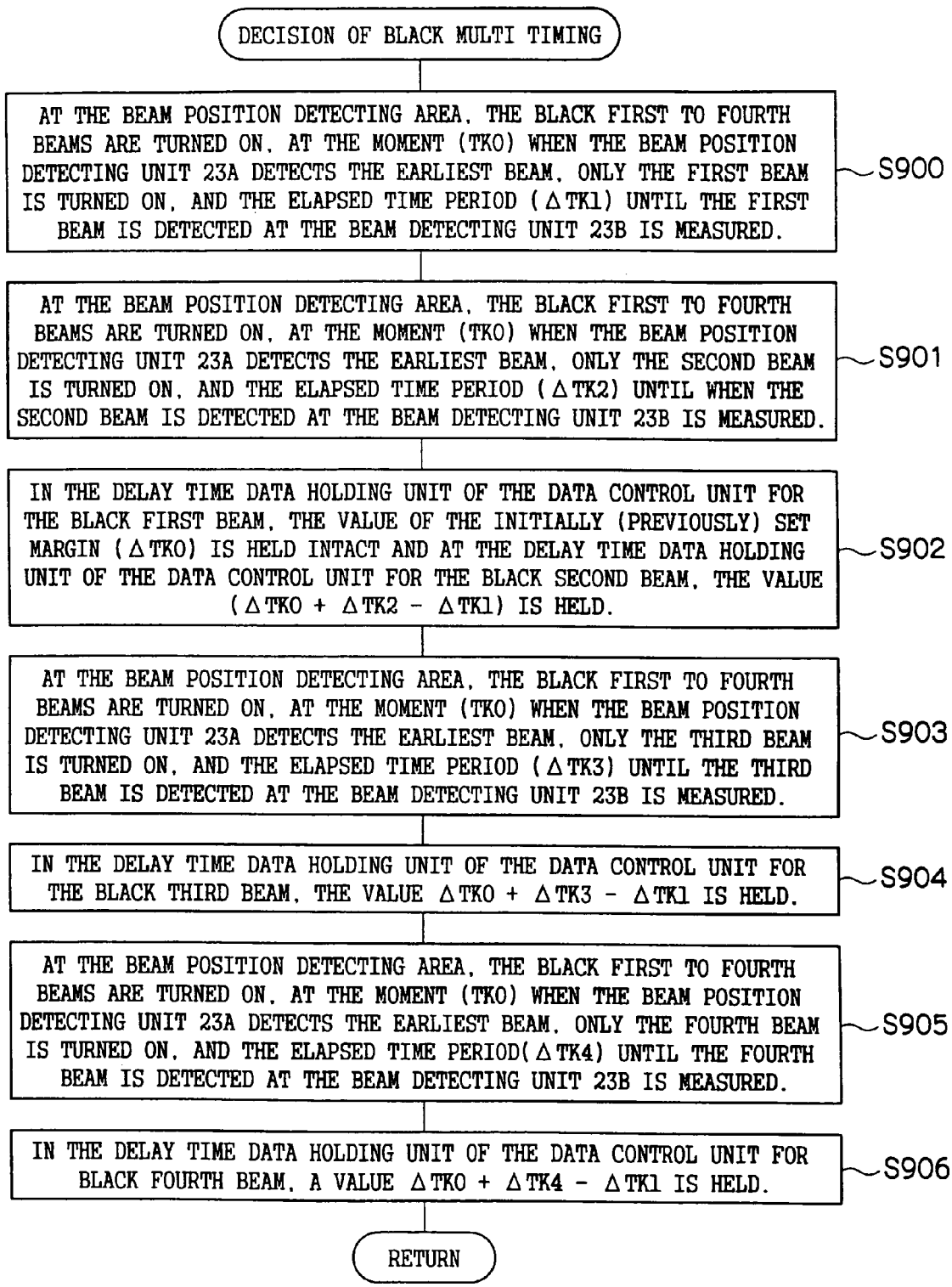
FIG. 29 is a flowchart showing details of the timing deciding processing of the black multi-beam in FIG. 28.

FIG. 29 is a flowchart showing the details of the timing deciding processing on black multi-beams (S90). Note that, in the timing deciding processing of black multi-beams, the laser beams of the other color components are inhibited from being emitted.

First, in the beam position detecting area, the black first to fourth laser beams are emitted; emission of only the first laser beam is allowed be continued from the moment Tk0 when the first main-scanning beam position detecting unit 23a of the horizontal synchronization sensor 23 detects the laser beam (regardless of which beam is the detected laser beam among the black-use first to fourth laser beams); and a time period ΔTk1, which is a period of time taken from the moment Tk0 to the moment when the second main-scanning beam position detecting 23b of the horizontal synchronization sensor 23 detects the first laser beam, is measured (S900).

Further, in the beam position detecting area, the black first to fourth laser beams are emitted; emission of only the second laser beam is allowed to be continued from the moment TK0 when the first main-scanning beam position detecting unit 23a of the horizontal synchronization sensor 23 detects the laser beam; and a time period ΔTk2, which is a period of time taken from the moment Tk0 to the moment when the second main-scanning beam position detecting unit 23b of the horizontal synchronization sensor 23 detects the second laser beam, is measured (S901).

Thereafter, while keeping the initially (or previously) set margin ΔTK0 of the delay time data holding unit of the data control unit 115B1 associated with the black-use first laser beam, the delay time data holding unit of the data control unit 115B2 associated with the black-use second laser beam is caused to hold a set margin ΔTK0+ΔTK2−ΔTK1, which is determined on the basis of the time thus measured (S902). The time period ΔTK2−ΔTK1 in the set margin ΔTK0+ΔTK2−ΔTK1 associated with black-use second laser beam is determined to a time difference between the black-use first and second laser beams in the main-scanning direction. Thus, the set margin associated with the black-use second laser beam is obtained by correcting the initially (or previously) set margin ΔTK0 by the amount of this time difference.

Further, in the beam position detecting area, the black-use first to fourth laser beams are emitted; emission of only the third laser beam is allowed to be continued from the moment TK0 when the first main-scanning beam position detecting unit 23a of the horizontal synchronization sensor 23 detects the laser beam; and a time period ΔTk3, which is a period of time taken from the moment Tk0 to the moment when the second main-scanning beam position detecting unit 23b of the horizontal synchronization sensor 23 detects the third laser beam, is measured (S903).

Then, the delay time data holding unit of the data control unit 115B3 associated with the black-use third laser beam is caused to hold a set margin ΔTK0+ΔTK3−ΔTK1, which is determined on the basis of the time thus measured (S904). The time period ΔTK3−ΔTK1 in the set margin ΔTK0+ΔTK3−ΔTK1 associated with black-use third laser beam is determined to a time difference between the black-use first and third laser beams in the main-scanning direction. Thus, the set margin of the black-use third laser beam is obtained by correcting the initially (or previously) set margin ΔTK0 by the amount of this time difference.

Further, in the beam position detecting area, the black first to fourth laser beams are emitted; emission of only the fourth laser beam is allowed to be continued from the moment TK0 when the first main-scanning beam position detecting unit 23a of the horizontal synchronization sensor 23 detects the laser beam; and a time period ΔTK4, which is a period of time taken from the moment Tk0 to the moment when the second main-scanning beam position detecting unit 23b of the horizontal synchronization sensor 23 detects the fourth laser beam, is measured (S905).

Thereafter, the delay time data holding unit of the data control unit 115B4 associated with black-use fourth laser beam is caused to hold a set margin ΔTK0+ΔTK4−ΔTK1, which is determined on the basis of the time thus measured (S906). The time period ΔTK4−ΔTK1 in the set margin ΔTK0+ΔTK4−ΔTK1 associated with the black-use fourth laser beam is determined to a time difference between the black-use first and fourth laser beams in the main-scanning direction. Thus, the set margin of the black-use fourth laser beam is obtained by correcting the initially (or previously) set margin ΔTK0 by the amount of this time difference.

In the case of the fourth embodiment, the laser beam which reaches the first main-scanning beam position detecting unit 23a of the horizontal synchronization sensor 23 earliest among the black-use first to fourth laser beams is determined as a reference beam. Note that which beam serves as the reference beam among the black-use first to fourth laser beams is not identified.

Figure 30:
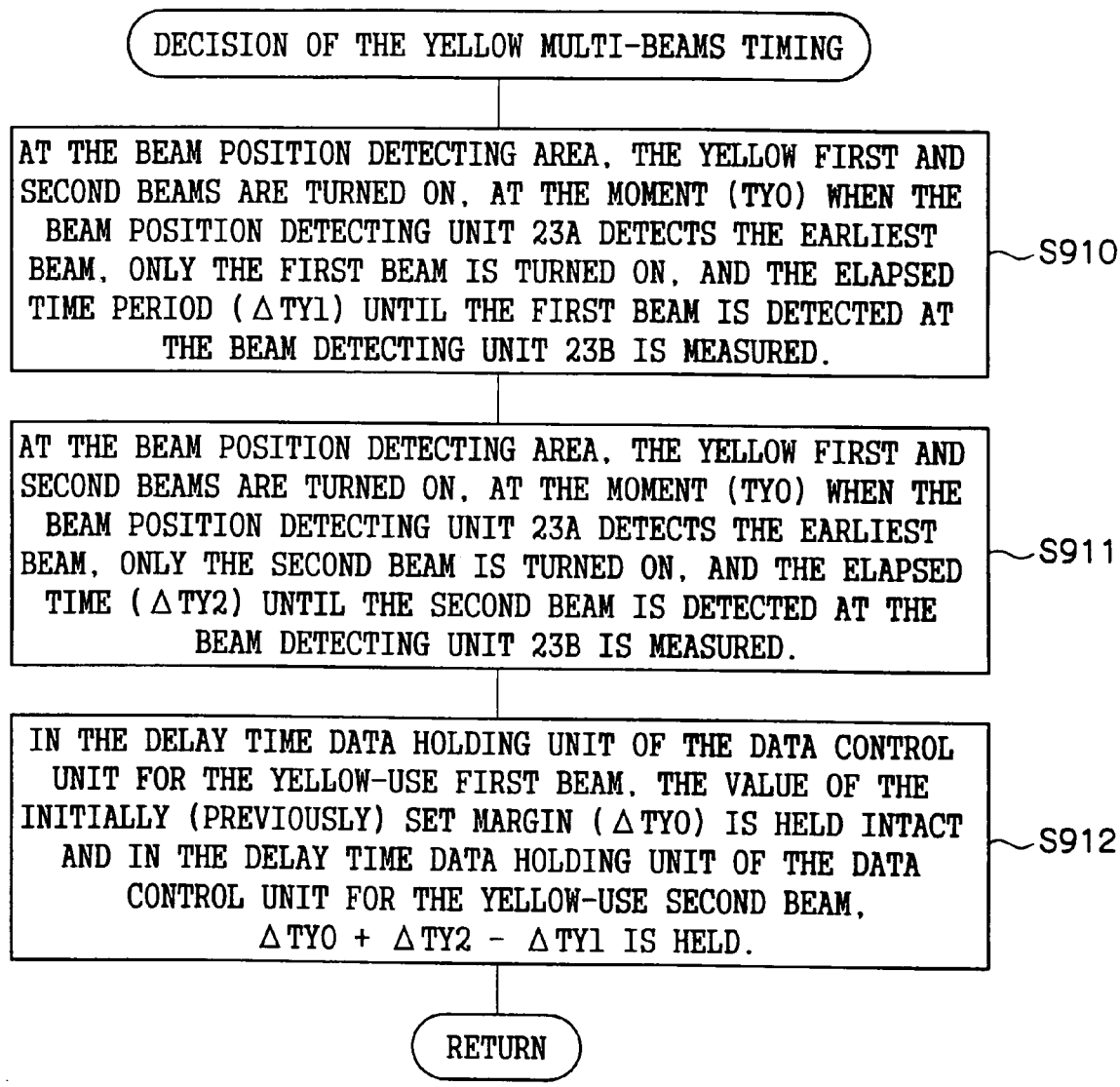
FIG. 30 is a flowchart showing details of timing deciding processing of the yellow multi-beam in FIG. 28.

FIG. 30 is a flowchart showing the details of timing deciding processing of the yellow multi-beams in FIG. 28 (S91). Note that, in the timing deciding processing f the yellow multi-beams, the laser beams of the other color component never be emitted.

First, in the beam position detecting area, the yellow-use first and second laser beams are emitted; emission of only the yellow-use first laser beam is allowed to be continued from the moment TY0 when the first main-scanning beam position detecting unit 23a of the horizontal synchronization sensor 23 detects either laser beam (regardless of which beam is the detected laser beam among the first and second laser beams); a time period Δ TY1, which is a period of time taken from the reference moment TY0 to the moment when the second main-scanning beam position detecting unit 23b of the horizontal synchronization sensor 23 detects the first laser beam, is measured (S910).

Further, in the beam position detecting area, the yellow-use first and second laser beams are emitted; emission of only the second laser beam is allowed to be continued from the moment TY0 when the first main-scanning beam position detecting unit 23a of the horizontal synchronization sensor 23 detects the laser beam; and a time period Δ TY2 which is a period of time taken from the moment TY0 to the moment when the second main-scanning beam position detecting unit 23b of the horizontal synchronization sensor 23 detects the second laser beam, is measured (S911).

Thereafter, while keeping the initially (or previously) set margin Δ TY0 of the delay time data holding unit of the data control unit 115Y1 associated with the yellow-use first laser beam intact, the delay time data holding unit of the data control 115BY2 associated with the yellow-use second laser beam caused to hold a set margin ΔTY0+ΔTY2−ΔTY1, which is determined on the basis of the time thus measured (S912).

The time period ΔTY2−ΔTY1 in the set margin ΔTY0+ΔTY2−ΔTY1 associated with the yellow-use second laser beam is determined to a time difference between the yellow-use first and second laser beams in the main-scanning direction. Thus, the set margin associated with the yellow-use second laser beam is obtained by correcting the initially (or previously) set margin Δ TY0 by the amount of this time difference.

Details of the timing deciding processing of the magenta multi-beams (S92) and the timing deciding processing of the cyan multi-beams (S93) in FIG. 28 are the same as details of the above-described timing deciding processing of yellow multi-beams (S91), so that the descriptions thereof are omitted.

FIG. 31 is a flowchart showing details of adjustment processing of the magnification and position in the main-scanning direction of black multi-beams (S94) shown in FIG. 28.

First, in the beam position detecting area, black-use first to fourth laser beams are emitted; writing of the registration measuring image is executed, with respect to the black first laser beam, from the moment when the initially (or previously) set margin of TK0 elapses from the moment when the first main-scanning beam position detecting unit 23a of the horizontal synchronization sensor 23 detects the laser beam (regardless of which beam is the detected laser beam of the black first, second, third and fourth laser beams), writing of the registration measuring image is executed, with respect to the black second laser beam, from the moment when the set margin of ΔTK0+ΔTK2−ΔTK1 elapses from the moment when the first main-scanning beam position detecting unit 23a of the horizontal synchronization sensor 23 detects the laser beam (regardless of which beam is the detected laser beam of the black first, second, third and fourth laser beams), writing of the registration measuring image is executed, with respect to the black third laser beam, from the moment when the set margin of ΔTK0+ΔTK3−ΔTK1 elapses from the moment when the first main-scanning beam position detecting unit 23a of the horizontal synchronization sensor 23 detects the laser beam (regardless of which beam is the detected laser beam of the black first, second, third and fourth laser beams), writing of the registration measuring image is executed, with respect to the black fourth laser beam, the moment when the set margin of ΔTK0+ΔTK4−ΔTK1 elapses from the moment when the first main-scanning beam position detecting unit 23a of the horizontal synchronization sensor 23 detects the laser beam (regardless of which beam is the detected laser beam of the black first, second, third and fourth laser beams) (S940).

Further, in the beam position detecting area, black-use first to fourth laser beams are emitted; writing of the registration measuring image is executed, with respect to the black first laser beam, from the moment when the initially (or previously) set margin of TK0 elapses from the moment when the second beam position detecting unit 23b of main-scanning horizontal synchronization sensor 23 detects the laser beam (regardless of which beam is the detected laser beam of the black first, second, third and fourth laser beams), writing of the registration measuring image executed, with respect to the black second laser beam, from a moment when the set margin of ΔTK0+ΔTK2−ΔTK1 elapses from the moment when the second beam position detecting unit 23b of main-scanning horizontal synchronization sensor 23 detects the laser beam (regardless of which beam is the detected laser beam of the black first, second, third and fourth laser beams), writing of the registration measuring image is executed, with respect to the black third laser beam, at a moment when the set margin of ΔTK0+ΔTK3−ΔTK1 elapses from the moment when the second beam position detecting unit 23b of main-scanning horizontal synchronization sensor 23 detects the laser beam (regardless of which beam is the detected laser beam of the black first, second, third and fourth laser beams), writing of the registration measuring image is executed, with respect to the black fourth laser beam at the moment when the set margin of ΔTK0+ΔTK4−ΔTK1 elapses from the moment when the second beam position detecting unit 23b of main-scanning horizontal synchronization sensor 23 detects the laser beam (regardless of which beam is the detected laser beam of the black first, second, third and fourth laser beams) (S941).

By way of the above-mentioned processing, with respect to each of the black first to fourth laser beams, two registration measuring images are written with reference to the first and second main-scanning beam position detecting units 23a and 23b of the horizontal synchronization sensor 23 in each of the upstream and downstream. These four registration measuring images, that is to say, the respective registration measuring images with reference to the beam position detecting units 23a and 23b, are written in such a manner that they are distanced in the sub-scanning direction (See FIG. 12). The patterns thus written are as shown in FIG. 12.

Then, a read time difference between the two registration sensors 78 and 80 is obtained; on the basis of this time difference, deviation magnification and lateral displacement amount in the main-scanning direction are calculated; an image clock corresponding to the magnification deviation is obtained; the above-mentioned set margin ΔTK0 is updated to a time corresponding to the lateral displacement amount in the main-scanning direction; and data for setting the difference in time ΔTK2−ΔTK1 between black first and second laser beams in the main-scanning direction, data for setting the time difference ΔTK3−ΔTK1 between black first and third laser beams in the main-scanning direction, and data for setting the time difference Δ TK4−Δ TK1 between black first and fourth laser beam in the main scanning direction, are also updated (S942).

Thereafter, the image clock generating unit 119B are caused to set a new image clock frequency (S943), and the delay time data holding units in the black element data control units 115B1, 115B2, 115B3 and 115B4 are caused to hold the updated setting margins ΔTK0, ΔTK0+ΔTK2−ΔTK1, ΔTK0+ΔTK3−ΔTK1, and ΔTK0+ΔTK4−ΔTK1, respectively (S944).

FIG. 32 is a flowchart showing details of the adjustment processing of the magnification and position in the main-scanning direction of color beams (S95).

First, in the beam position detecting area, the black-use first to fourth laser beams are emitted; emissions of the other color component laser beams are stopped; the registration measuring images for the respective colors are written by means of the yellow-use laser beam, magenta-use laser beam, or cyan-use laser beam, respectively, at moments when a previously (initially) set margin ΔTY0, ΔTM0, and ΔTC0 elapses from the moment, when the first main-scanning beam position detecting unit 23a of the horizontal synchronization sensor 23 detects the black-use laser beam (regardless of which laser beam is the detected laser beam among the black-use first to fourth laser beam) (S950). Note that emissions of the first to fourth black-use laser beam are stopped from the moment when the first main-scanning beam detecting unit 23a of the horizontal synchronization sensor 23 detects the black-use laser beam. Also, as the respective color-use registration measuring images, a pattern similar to the pattern RB1 shown in FIG. 12 is written.

Further, writing of the registration measuring images by means of the yellow-use, magenta-use, and cyan-use laser beams is executed by two of the yellow-use, magenta-use, and cyan-use first and second laser beams.

Thereafter, the time difference between the two registration sensors 78 and 80 is obtained; on the basis of this time difference, deviation magnification and lateral displacement amount in the main-scanning direction of the yellow-use laser beam, magenta-use laser beam, and cyan-use laser beam are calculated; an image clock corresponding to the deviation magnification is obtained; and the above-mention set margins ΔTY0, ΔTM0, and ΔTC0 are updated to a time corresponding to the lateral displacement amount in the main-scanning direction (S951).

Thereafter, the yellow-use, magenta-use, and cyan-use image clock generating units 119Y, 119M, and 119C are caused to set a new image clock frequency (S952), and also the delay time data holding units of the yellow-use, magenta-use, and cyan-use data control units 115Y, 115M, and 115C are caused to hold the updated set margins ΔTY0, ΔTM0, and ΔTC0, respectively (S953).

The above-mentioned processing serves as a review of an inter-beam pitch between a reference beam to which any one of the black-use first to fourth laser beams correspond and one (or sets) of the yellow-use, magenta use, cyan-use laser beams.

After completing the processing of the above-mentioned registration correction mode (S90 to S95 in FIG. 28), the sequence shifts to the processing of the image forming mode (image writing; S96), in which the timing control shown in FIG. 33 is executed.

The black-use or color-use image clock is set to the value determined in the above-mentioned registration correction mode (S960).

In the beam position detecting area, the black-use first to fourth laser beams are emitted; emissions of the other color component laser beams are stopped; emissions of the black-use first to fourth laser beams are stopped when the first main scanning beam position detecting unit 23a of the horizontal synchronization sensor 23 detects the black-use laser beam (regardless of which beam is the detected laser beam among the black-use first to fourth laser beams); and the black-use first laser beam, the black-use second laser beam, the black-use third laser beam, the black-use fourth laser beam, the yellow-use first laser beam, the yellow-use second laser beam, the magenta-use first laser beam, the magenta-use second laser beam, the cyan-use first laser beam and the cyan-use second laser beam, respectively write images at moments when setting margins ΔTK0, ΔTK0+ΔTK2−ΔTK1, ΔTK0+ΔTK3−ΔTK1, ΔTK0+ΔTK4−ΔTK1, ΔTY0, ΔTY0+ΔTY2−ΔTY1, ΔTM0, ΔTM0+ΔTM2−ΔTM1, ΔTC0, and ΔTC0+ΔTC2−ΔTC1 elapses from the moment of detection, respectively (S961).

Thus, in the third embodiment, with respect to all the laser beams, writing of images is executed with reference to the horizontal synchronization timing of the most preceding laser beam among the black-use first to fourth laser beams.

The optical beam scanning device and the image forming apparatus according to the third embodiment exhibit the succeeding advantages.

While the laser beams of all the color components are guided to the horizontal synchronization sensor, the synchronization sensor is provided at a position displaced in the sub-scanning direction from the substantial plane on which the deflected laser beams from the light deflecting unit pass, whereby the laser beams of the respective color components are guided to the horizontal synchronization sensor in a time-division manner. Owing to this configuration, in the deflecting angle from the light deflecting unit, the ratio of the deflecting angle for guiding to the horizontal synchronization sensor can be made smaller than prior art (See FIG. 16A).

Accordingly, when the same post-deflection optical system is used, the image effective angle (area) can be made larger than prior art. Alternatively, for securing the same image effective angle (area), deflecting angle whose performance must be substantial secured can be made smaller than prior art, that dimensions of the optical elements for image formation and the polyhedral mirror body (rotating polygon mirror) can be reduced.

Further, at the time of image writing, only one laser beam of black-use is guided to the horizontal synchronization sensor, synchronization processing can be performed easily. In this way, at the time of image writing, only a preceding black-use laser beam is guided to the horizontal synchronization sensor, and with respect to the other color components, image forming is executed with reference to the moment when the horizontal synchronization sensor detects the preceding black-use laser beam, so that substantially sufficient image quality can be secured.

Specifically, human sensitivity tests show that, where an image is formed by means of a plurality of laser beams, if a relative position between laser beams is larger than 10 μm, the jaggy of the straight line in the sub-scanning direction are perceived by human eyes. In view of the foregoing, a configuration is employed in which the black-use four laser beams that form the same image are respectively detected by means of the synchronization sensor, and with respect to second to fourth laser beams, the time difference in the main-scanning direction from the first laser beam is corrected. Also two laser beams for color-use which form the same images are respectively detected by the synchronization sensor and with respect to the second laser beam, the difference in time in the main-scanning direction from the first laser beam is corrected. Owing to the above configuration, the inter-beam pitch displacement with respect to the same color is reduced to a value of 10 μm (p—p) or shorter.

The sensitivity test shows that, where images of different color components are superposed to form a color image, if the displacement amount between the images of the respective color components is larger than 85 μm, the displacement in color exceeds an allowable extent. With respect to the other color components, image forming is executed with reference to the moment when the horizontal synchronization sensor detection of the black-use preceding laser beam. Also, the detection of the lateral displacement amount in the main-scanning direction in the registration correction mode is corrected by writing and capturing a registration image the moment when the black-use preceding laser beam is detected, positional displacement between black-use laser beam and the color component laser beam can reduced to the value of 85 μm or smaller.

Further, also in the third embodiment, with respect to black-use respective laser beams, by means the method described in the first embodiment, the magnification deviation in the main-scanning direction is detected. Owing to this configuration, even where the precision in installation of the registration sensors 78 and 80 is low, a magnification deviation in the main-scanning direction can be detected with a high degree of accuracy, and the magnification deviation can be compensated in an appropriate manner.

(Other Embodiment)

The present invention can be applied to the optical beam scanning device of the type in which laser beams are made incident from two directions and two mirror surfaces of the polygon mirror are used.

Further, where the number of the laser beams used for forming a black latent image is two and the number of the laser beams used for forming other-color latent image is one beam; instead of using the horizontal synchronization sensor as shown in FIG. 4, an ordinary horizontal synchronization sensor having one detecting position in the main-scanning direction can be used for the side that reflects two laser beams each of which forms a latent image by means of one beam.

Moreover, in the first and second embodiments, where the image forming apparatus has a high-resolution mode exclusively used for black, high-speed mode exclusively used for black, or both of them, and a color mode; when only a latent image for black is printed, a plurality of laser beams are used; when color printing is executed, only one black-use light beam is used. Even in such a case, by applying the invention, it advantageously becomes unnecessary to provide a horizontal synchronization sensor with respect to each color component. When black-use plural laser beams are used (although in the first and second embodiments, the number of laser beams is two, the same flow (sequence) of processing can be applied to the cases where the number of laser beams is four or eight), it is sufficient that the adjustment processing of magnification and position in the main-scanning direction shown in FIGS. 8 and 18 (S3, S7) are skipped; and that when image writing is executed, the processing steps with respect to yellow, magenta and cyan are skipped. When color printing is executed, it is sufficient that the processing with respect to the second laser beam in the second multi-beams is skipped. When a high-speed mode is provided, means for controlling the number of rotations of the polygon mirror is added so as to cause the polygon mirror to rotate at a rotational speed that is (the number of black-use beams)-fold, whereby a printing speed of (the number of black-use beams)-fold at color printing can be realized.

Further, in the third embodiment, where the image forming apparatus has a high-resolution mode exclusively used for black, a high-speed mode exclusively used for black, or both of them, and a color mode; when only the black-use latent image is printed, all of the black-use beams (in the embodiment, the number of the beams is four) are used; when color printing is executed, the number of the black-use beams has a value which is equal to the number (in the embodiment, the number is two) used when the other latent images are formed. Even in such a case, by applying the present invention, such advantages can be produced that it becomes unnecessary to provide the horizontal synchronization sensor with respect to each color component. When black-use plural laser beams are used, it is sufficient that the steps of the multi-beams timing decision of yellow/magenta/cyan in FIG. 28 (S91 to S93), adjustment of magnification and position in the main-scanning direction of color-use beam (S95) are skipped, and at the time of image writing, the processing as to yellow, magenta, and cyan are skipped. When color printing is executed, in the black multi-beams, it is sufficient that the processing as to black-use beams that exceeds the number of the color-use beams is skipped. When a high-speed mode is provided, first, a means for controlling the number of rotations of the polygon mirror is added, next, if the polygon mirror is adapted to rotate at a rotational speed which is (the number of black-use beams/the number of color-use beams)-fold of the number of rotation of the polygon mirror at the time of color printing, the printing speed of (the number of black-use beams/the number of color-use beams)-fold in the color printing can be realized.

In the above description, although it is shown that the black-use laser beam is the laser beam which serves as a reference for the horizontal synchronization at the time of writing, laser beams of the other color components can also be employed. In this case, the color component serving as a reference needs to be a color component which can form a latent image by means of a plurality of laser beams.

Further, the above description, the configuration is shown in which the number of black-use laser beams is greater than the number of laser beams of the other color components. However, it is sufficient that the number of the black-element laser beams is equal to the number of the other color components' laser beams. (Note that the case where the number of laser beams is one is excluded.)

The technical ideas described in the above-mentioned embodiments may be employed by combining their parts. For example, in the third embodiment, as in the first embodiment, the preceding black-use laser beam is identified; a correspondence is established between an initially set margin TK0 and the laser beam thus identified; with respect to the other laser beams, the set margins are reviewed using the preceding black-use laser beam as a reference of the horizontal synchronization timing.

Further, although the horizontal synchronization sensor performs detection of a laser beam at an upstream side of the main-scanning direction, a detecting means in which the detection of laser beam may be performed at a downstream side of the main-scanning direction can also be available.

In the above description, the combination of color components are selected from black, yellow, magenta and cyan. However, the present invention can be applied to an apparatus which forms a color image by means of combinations of the other color components.

The method described in the first embodiment can be applied to the image forming apparatus having only one photosensitive drum, in which two registration measuring images written out with a predetermined distance provided therebetween in the main-scanning direction are read so as to obtain a magnification deviation in the main-scanning direction.

Further, in the first embodiment, in order to detect a magnification deviation in the main-scanning direction, two types of registration measuring images written out with a predetermined distance provided therebetween are written out by black-use first and second laser beams, respectively. However, it is sufficient that only for detecting the magnification deviation in the main-scanning direction, two registration measuring images are written, by means of the same laser beam.

Moreover, it is sufficient that the operation for deciding timing for other light beams to the reference light beam used for the respective latent images forming timings at the time when one latent image is formed using a plurality of light beams or judgment of the order of the multi-beams incidence are only executed between the image forming areas while timing between a plurality of latent images and registration processing including image frequency are executed at the timing of power activation and a predetermined timing (i.e., a predetermined number of images are printed, greater temperature change than a predetermined value obtained at the time of previous registration processing is obtained, or displacement obtained by continuous measuring of the registration outside the imaging area exceeds a predetermined value or the like). In addition, it is sufficient that further enhancement of precision can be achieved by performing the entire registration correction such as multi-beams timing processing and judgment of the order of multi-beams incidence between each imaging area.

What is claimed is:

1. An image forming apparatus comprising:
   an optical beam scanning device forming the plurality of latent images; and
   an image writing control unit;

wherein
said optical beam scanning device forms one of the plurality of latent images, which are to be formed, with a plurality of light beams while forming the other latent images respectively by one light beam and includes:
a plurality of light sources;
a pre-deflection optical unit for providing predetermined characteristics for the plurality of light beams from the plurality of light sources;
one light-deflection unit for deflecting, in a predetermined direction, light beam bundles from said pre-deflection unit, which light beam bundles form the plurality of latent images with one surface or an integrally processed surface;
a post-deflection optical unit for causing the plurality of light beams deflection-scanned with the light-deflection unit to image on corresponding respective scanned surfaces, so that the plurality of latent images are formed;
a horizontal synchronization unit which is on a position of an upstream side of scanning lines by a light beam, which light beam forms a latent image formed by the plurality of light beams, among the plurality of light beams passed through a part of the post-deflection optical unit and detects that the each light beam forming the latent image formed by the plurality of light beams reaches a predetermined position; and
in an image forming mode, after said horizontal synchronization unit detects that, one of the plurality of light beams forming the latent image formed by the plurality of light beams reaches a predetermined position, said image writing control unit performs on-off control of said respective light sources for the detected light beam and for the each light beam forming one latent image by the one light beam in accordance with image data after a predetermined time period defined by a registration correction information at that time elapses.

2. The image forming apparatus according to claim 1, wherein said one light beam detected by said horizontal synchronization unit is the light beam that reaches the predetermined position earliest when the plurality of light beams which form the one latent image are caused to deflection-scan simultaneously.

3. The image forming apparatus according to claim 1, wherein in the image forming mode, also with respect to the other respective light beams among the plurality of light beams forming the latent image formed by the plurality of light beams, after said horizontal synchronization unit detects that said one light beam reaches the predetermined position,
said image writing control unit performs the on-off control of said respective light sources for the other respective light beams in accordance with the image data after the predetermined time period defined by the registration correction information at that time elapses.

4. The image forming apparatus according to claim 1, wherein in the image forming mode, with respect to each of the other respective light beams among the plurality of light beams forming the latent image formed by the plurality of light beams, after said horizontal synchronization unit detects that the light beam reaches the predetermined position, said image writing control unit performs the on-off control of said respective light sources for each of the other light beams in accordance with the image data after the predetermined time period defined by the registration correction information at that time elapses.

5. The image forming apparatus according to claim 1, comprising:
a pair of registration sensors which detect positions of the respective images superposed on one medium after developing the respective latent images formed on a basis of registration measuring image data;
a registration correction information calculating unit which re-calculates, on the basis of detected outputs of the pair of registration sensors, the registration correction information with respect to the respective light beams; and
a registration correction information holding unit that holds the calculated registration correction information;
wherein
said image writing control unit performs the on-off control of said respective light sources in the registration correction mode so that the latent image of the registration measuring image is formed.

6. The image forming apparatus according to claim 5, wherein operation in said registration correction mode is performed at timing of an area other than an imaging area in a sub-scanning direction.

7. The image forming apparatus according to claim 5, wherein
in the registration correction mode, after said horizontal synchronization unit detects that one of the plurality of light beams forming the latent image formed by the plurality of light beams reaches the predetermined position, said image writing control unit performs the on-off control of said respective light sources for the respective light beams forming the one latent image by the one light beam in accordance with the registration measuring image data after the predetermined time period defined by the registration correction information at that time elapses.

8. The image forming apparatus according to claim 7, wherein in the registration correction mode, also with respect to the other respective light beams among the plurality of light beams forming the latent image formed by the plurality of light beams, after said horizontal synchronization unit detects that said one light beam reaches the predetermined position, said image writing control unit performs the on-off control of said respective light sources for the respective light beams in accordance with the registration measuring image data after the predetermined time period defined by the registration correction information at that time elapses.

9. The image forming apparatus according to claim 7, wherein in the registration correction mode, with respect to each of the other respective light beams among the plurality of light beams forming the latent image formed by the plurality of light beams, after said horizontal synchronization unit detects that the light beam reaches the predetermined position, said image writing control unit performs the on-off control of said respective light sources for the respective light beams in accordance with the registration measuring image data after the predetermined time period defined by the registration correction information at that time elapses.

10. The image forming apparatus according to claim 5, wherein as information by said registration correction information calculating unit, main-scanning direction time difference information between the other respective light beams and one light beam among the plurality of light beams forming one latent image by the plurality of light beams is included.

11. The image forming apparatus according to claim 10, wherein in the registration correction mode, with respect to each of the other light beams other than said one light beam which is an object for detection by said horizontal synchronization unit among the plurality of light beams forming the latent image formed by the plurality of light beams, after said horizontal synchronization unit detects that said one light beam reaches a predetermined position, said image writing control unit performs the on-off control of said respective light sources for the other respective light beams after a time period elapses in which the predetermined time period defined by the registration correction information at that time is corrected using the main-scanning direction time difference information at that time between said one light beam and said each of the other light beams, and in accordance with registration measuring image data having a frequency defined by the registration correction information at that time.

12. The image forming apparatus according to claim 1, wherein in the image forming mode, with respect to each of the other light beams other than said one light beam which is an object for detection by said horizontal synchronization unit among the plurality of light beams forming the latent image formed by the plurality of light beams, after said horizontal synchronization unit detects that said one light beam reaches the predetermined position, said image writing control unit performs the on-off control of said respective light sources for the other respective light beams in accordance with the image data after a time period elapses in which the predetermined time period defined by the registration correction information at that time is corrected using time difference information detected by the horizontal synchronization unit in main-scanning direction at that time between said one light beam and said each of the other light beams measured in a registration correction mode.

* * * * *